United States Patent
Chakrovorthy et al.

(10) Patent No.: US 9,767,317 B1
(45) Date of Patent: Sep. 19, 2017

(54) SYSTEM TO PROVIDE CRYPTOGRAPHIC FUNCTIONS TO A MARKUP LANGUAGE APPLICATION

(71) Applicant: AMAZON TECHNOLOGIES, INC., Reno, NV (US)

(72) Inventors: Sreeram Raju Chakrovorthy, Campbell, CA (US); Celil Urgan, Santa Clara, CA (US); Shinjan Kumar Tiwary, Sunnyvale, CA (US); Joseph Everett Bentley, Seattle, WA (US); Jaee Patwardhan, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 476 days.

(21) Appl. No.: 14/225,175

(22) Filed: Mar. 25, 2014

(51) Int. Cl.
*G06F 21/71* (2013.01)
*G06F 21/70* (2013.01)
*G06F 21/53* (2013.01)

(52) U.S. Cl.
CPC .............. *G06F 21/71* (2013.01); *G06F 21/53* (2013.01); *G06F 21/70* (2013.01)

(58) Field of Classification Search
None
See application file for complete search history.

(56) References Cited

U.S. PATENT DOCUMENTS

| | | | |
|---|---|---|---|
| 7,110,982 B2* | 9/2006 | Feldman | G06Q 20/382 380/202 |
| 7,630,499 B2* | 12/2009 | Wasilewski | H04N 5/913 380/239 |
| 2005/0091491 A1* | 4/2005 | Lee | G06F 21/10 713/167 |
| 2013/0152180 A1* | 6/2013 | Nair | H04L 63/0823 726/6 |
| 2014/0123170 A1* | 5/2014 | Kummer | H04N 21/2347 725/31 |

* cited by examiner

*Primary Examiner* — Azizul Choudhury
(74) *Attorney, Agent, or Firm* — Lindauer Law, PLLC

(57) ABSTRACT

A browser includes modules to provide markup language applications with access to cryptographic functions executing in a secure zone. Non-secure operations associated with the cryptographic functions called by the markup language application may be executed in a virtual machine. Sensitive data such as cryptographic keys may be "wrapped" or encrypted by the secure zone using a key. The encrypted sensitive data may then be stored in non-secure memory for further use. Upon request by the cryptographic functions, the encrypted sensitive data may be retrieved and decrypted with the secure zone for use.

21 Claims, 10 Drawing Sheets

SYSTEM TO PROVIDE CRYPTOGRAPHIC FUNCTIONS TO A MARKUP LANGUAGE APPLICATION

BACKGROUND

Content such as television shows, movies, music, games, electronic books (eBooks), and so forth may be consumed by users on a wide variety of devices ranging from televisions in living rooms to handheld devices while on the go. Content providers, distributors, or other interested parties may use various digital rights management (DRM) techniques to control presentation of the content.

Figure 1:
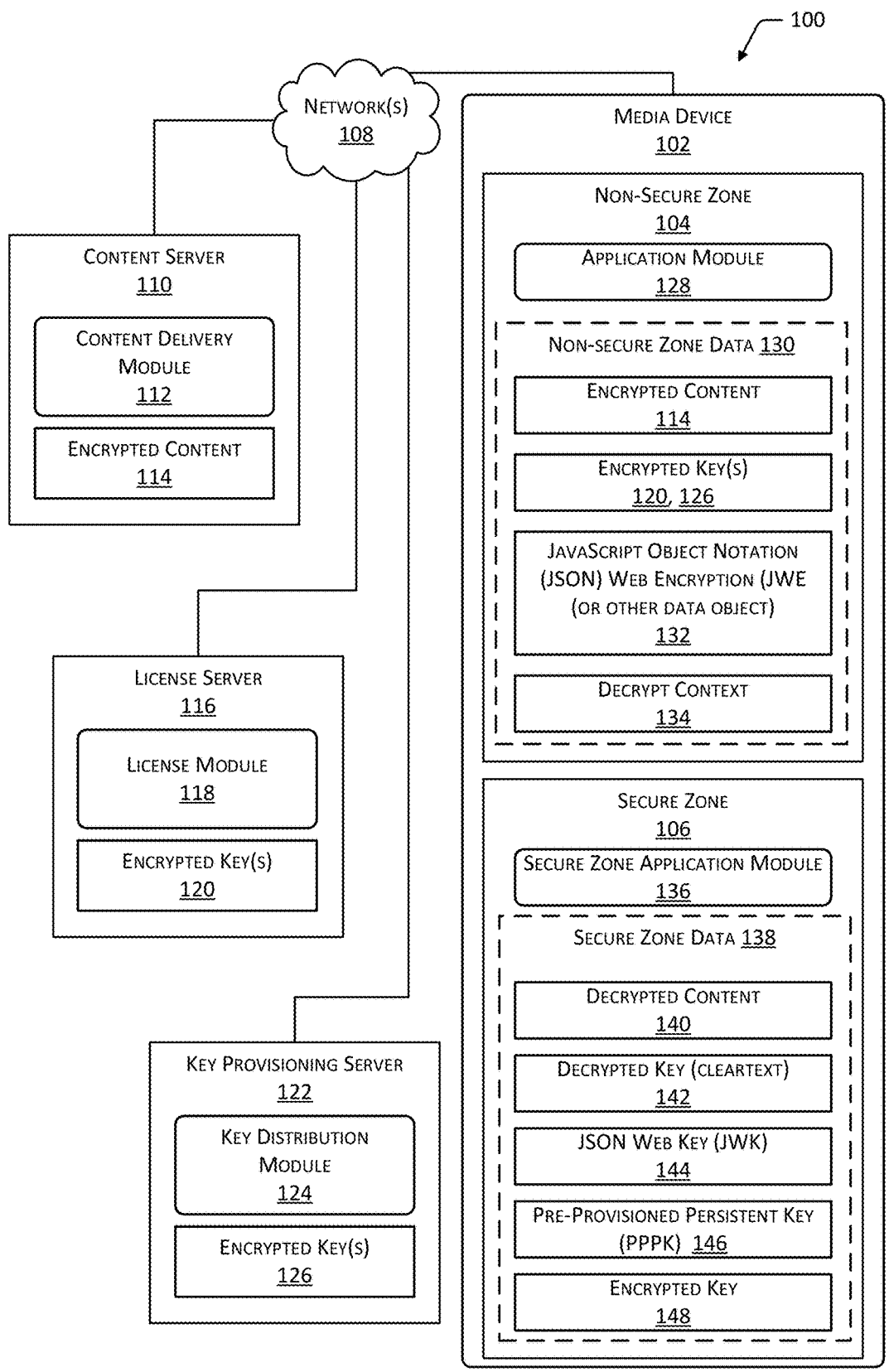
FIG. 1 is an illustrative system for distributing and presenting encrypted content on a media device executing a markup language application.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Content providers, distributors, or other interested parties may use various digital rights management (DRM) techniques to control presentation of content on a media device. The media device may include a television, set-top box, smartphone, tablet computer, desktop computer, laptop computer, in-vehicle system, wearable computing device, portable media player, and so forth.

The DRM techniques may be used to limit presentation of the content to a particular media device or groups of devices, user, date and time, geographic location, and so forth. For example, the content provider may use DRM techniques or systems to limit presentation of content to a user with a valid account.

The content protected using DRM may include, but is not limited to, content such as television shows, movies, music, games, electronic books (eBooks), and so forth. One technique for protecting this content is to encrypt at least a portion of the content using a cryptographic key ("key" or "key value"). This may include encrypting the content prior to transmission, transmitting the content using an encrypted connection, encrypting the content with one key and the transmission with another key, and so forth.

The key may be distributed to a media device which may then use the key to decrypt the encrypted content for presentation. To safeguard the key used to decrypt the content, the key may be encrypted using another key which is already known to the media device. For example, a content master key used for content decryption may be encrypted using a pre-provisioned persistent key issued to the media device at a time of manufacture.

The media devices may be configured to execute applications which are native, use a markup language, or a hybrid thereof. Native applications may be written in languages such as C or C++ and are compiled for execution on the particular hardware architecture of the media device. In comparison, a markup language application is executed by a browser. For example, the markup language application may be expressed using hypertext markup language revision 5 (HTML5) or subsequent versions or successors. Compared to native applications, markup language applications are typically easier to deploy across different media devices, may be simpler to maintain, and so forth.

However, the interested parties may deem the markup language applications and operating systems they execute on as being too insecure for use. As a result, software developers been driven to develop native applications to present content.

Described in this disclosure are techniques to provide a cryptographically secure environment in which a markup language application, such as an HTML5 application, is able to utilize cryptographic operations which take place within a secure zone.

The media device may include hardware and software capable of supporting a secure zone and a non-secure zone without resorting to separate hardware. Thus, the media device may be configurable to execute instructions with the secure zone or the non-secure zone. The secure zone may implement various techniques to prevent malicious access or inadvertent release of sensitive information. For example, the secure zone may have a secured operating system (OS) kernel, set of synchronous libraries, or other mechanism which supports a restricted set of operations which is different from a non-restricted set of non-secure operations. In the implementation where the synchronous library is used, operation of the secure zone may be scheduled and managed using software calls from the non-secure OS. The media device may use the secured OS kernel, dedicated hardware, and other techniques to tightly control access to memory or other devices while operating with the secure zone. For example, memory may include a bit or register value which allows for designation of a particular memory location as being accessible to the secure zone, the non-secure zone, or both. Continuing the example, the bit or register value may also be used to indicate read/write privileges to that memory location for a particular zone. In another example, access or use of one or more components of the media device may be restricted or permitted. For example, while in the secure zone, a data bus may be unlocked to allow for data transfer to a dedicated portion of the processor which is configured to provide hardware acceleration of encryption.

In comparison, the non-secure zone may execute an operating system which is not deemed secure. For example, the non-secure operating system may be based at least in part on the Android® operating system by Google, Inc. of Mountain View, Calif. Data stored with the non-secure zone may be subject to compromise such as attack, copying, modification, and so forth. To improve security, in some implementations the secure zone may be stateless, as compared to the non-secure zone which may retain state.

In one implementation, the media device may be based at least in part on an architecture implementing at least a portion of the ARM® TrustZone® Technology from ARM Holdings PLC of Cambridge, England. For example, the media device may incorporate an ARM Cortex™-A8, Cortex™-A9, Cortex™-A9 MPCore™, and so forth. In this implementation, the secure zone corresponds to the Secure world of the TrustZone® and the non-secure zone corresponds to the Normal world of the TrustZone®.

The media device may also be based at least in part on, or use aspect of, other architectures or technologies, including but not limited to those from: MIPS Technologies Inc. of Sunnyvale, Calif.; VideoCore from Broadcom Corp. of Irvine, Calif.; Intel Corp. of Santa Clara, Calif.; Trusted Platform Module (TPM) as codified by ISO/IEC 11889, and so forth.

Benefits accrue from performing tasks which do not implicate sensitive data with the non-secure zone while performing tasks involving sensitive data with the secure zone. These benefits include improved security, reduced processing times, and so forth. For example, by minimizing operations with the secure zone, fewer opportunities are provided for malicious or erroneous operation. Furthermore tasks performed with the non-secure zone may execute more quickly, or may benefit from access to additional functionality such as classes, libraries, processor functions, memory functions, and so forth.

Tasks with the non-secure zone may gain additional security benefits when executed as interpreted applications within a virtual machine. For example, the virtual machine may be configured to restrict access to memory or peripherals, shutdown on detection of an error state, and so forth. The interpreted applications may be expressed using a language such as Java as promulgated by Oracle Corporation of Redwood City, Calif. The interpreted application may be compiled to a bytecode which is then executed by a virtual machine. Continuing the example, the virtual machine may comprise the Dalvik virtual machine as executed in the Android™ OS.

Given the stateless nature of the secure zone in some implementations, setting up for cryptographic operations with the secure zone may involve requesting the same key from a license server each time the encrypted content is accessed for presentation. Each request for the key introduces delay and increases the use of other resources such as electrical power on portable media devices, processor time on the license server, and so forth.

As described in this disclosure, the media device may provide a JavaScript to Java binding with which the HTML5 application is able to access cryptographic functions with the secure zone by way of an interpreted crypto application executing on the virtual machine. For example, the interpreted crypto application may implement the WebCrypto Application Programming Interface (API) as promulgated by the World Wide Web Consortium (W3C). The interpreted crypto application may be configured to provide functionality for which the secure zone is not necessary. For example, non-secure operations include base64 conversion, public key verification, generation of a byte array, and so forth.

The HTML5 application, the interpreted crypto application, and so forth may be configured to process keys stored in JavaScript Object Notation (JSON) Web Encryption (JWE) objects or JSON Web Key (JWK) objects. The JWE objects may be compliant with at least a portion of the JSON Web Encryption standards promulgated by the Internet Engineering Task Force (IETF). Likewise, the JWK objects may be compliant with at least a portion of the JSON Web Key standards promulgated by the IETF.

During operation, the HTML5 application may receive a first data object which includes an encrypted key to the content. To safeguard the key from unwanted distribution, key cleartext is encrypted by a license server. The HTML5 application may send the first data object to the interpreted crypto application which in turn generates a byte array. The byte array, which includes the encrypted key, is provided to the secure zone. A secure zone application may unwrap the encrypted key or perform other cryptographic operations necessary to decrypt the key and provide cleartext with the secure zone.

The secure zone application may then use the decrypted key, now in cleartext, to decrypt the content. Once decrypted, the content may be presented or otherwise consumed according to DRM limitations. The secure zone application may take the cleartext of the key and generate a second encrypted key. In one implementation, the cleartext of the key is encrypted to form a second encrypted key, using a system key known or accessible only to processes of the secure zone. Because the system key is unknown outside of the secure zone, the encrypted data may be safely stored outside of the secure zone. The second encrypted key may thus be exported from the secure zone as a second data object, such as a JWE.

The HTML5 application may receive the second data object and store for later use in an appropriate data structure. For example, the HTML5 application may receive the JWE which includes the second encrypted key. The HTML5 application may then store the JWE in a data structure with the non-secure zone. For example, the HTML5 application may use an API call to IndexedDB as promulgated by the W3C.

As mentioned above, the secure zone may be stateless, thus at a later time the key used to decrypt the content may be unavailable. Instead of requesting the key again from the license server, the second data object may be retrieved from storage with the non-secure zone and sent to the secure zone. For example, the HTML5 application may use an API call to IndexedDB to retrieve the second data object. The HTML5 application may then send the second data object to the interpreted crypto application for processing and placement into the secure zone. The HTML5 application is thus able to securely store cryptographic keys which are associated with access to the content of the non-secure area, and retrieve those keys on demand and without need to contact the license server. As a result, user experience may be improved as content is available for presentation more quickly.

A DRM bridge module may be provided in some implementations. The DRM bridge module couples an Encrypted Media Extension (EME) module to a DRM manager module and a crypto pipeline module. The EME module is compliant with at least a portion of the Encrypted Media Extensions as promulgated by the W3C. The DRM manager module is configured to be compliant with at least a portion of the DRM Manager class as promulgated by Google, Inc. The crypto pipeline module may be compliant with at least a portion of the MediaCrypto module as promulgated by Google, Inc.

The DRM bridge module may be configured to generate a decrypt context. The decrypt context comprises data indicative of a binding between a license or key which is stored for use by the secure zone and one or more processes running in the non-secure zone. The decrypt context may then be used to configure the secure zone for decryption of the content.

For ease of illustration and not by way of limitation, the examples in this disclosure describe a single key, however the techniques described herein are applicable to a plurality of keys, or other data which may need to be secured cryptographically such as a hash, signature, and so forth.

The techniques described in this disclosure may be used in conjunction with a variety of encryption techniques and standards. For example, the Advanced Encryption Standard (AES) as promulgated by the National Institute of Standards and Technology (NIST) including AES cipher-block chaining (AES-CBC), AES Galois/Counter Mode (AES-GCM), AES Key Wrap (AES-KW), and so forth. In other examples, the techniques may be applied to hash-based message authentication codes (HMAC), the Simple Hash Algorithms (SHA) including SHA256, simple public-key infrastructure (SPKI), and so forth.

By using the techniques described in this disclosure, encrypted content may be presented on a media device through execution of a markup language application. For example, an HTML5 (or later version) application executing within a browser executing on the Android' OS may use the hardware in the media device which implements the Trust-Zone® Technology from ARM Holding PLC to present encrypted video content. Software developers may more easily provide access to encrypted content, while reducing development costs. Furthermore, user experience may be improved as the same markup language is made available across different media devices, improving consistency of usage and accessibility across those different media devices.

Illustrative System

FIG. 1 is an illustrative system 100 for distributing and presenting encrypted content. In this illustration, a media device 102 is depicted. The media device 102 may include a television, set top box, gaming console, cable television interface, audio/video receiver, tablet computer, smartphone, laptop computer, desktop computer, and so forth.

The media device 102 includes hardware and software which supports a non-secure zone 104 and a secure zone 106 without resorting to separate hardware. For example, the media device 102 may use a single processor core to provide both the non-secure zone 104 and the secure zone 106, as compared to a dedicated cryptographic processor. In another example, computer-readable storage media such as random access memory may be shared for use between the non-secure zone 104 and the secure zone 106, with such sharing mediated in hardware to prevent data leakage between the zones. The media device 102 is configurable to execute instructions, store information in memory, and perform other operations with the non-secure zone 104 or the secure zone 106. Instructions include code or sequences of a computer program, or expressed in hardware, which put an operation into effect. Operations may include, but are not limited to, mathematical functions, moving data, or modifying data.

The secure zone 106 may implement various techniques to prevent malicious access or inadvertent release of sensitive information. For example, the secure zone 106 may have a secured operating system (OS) kernel which supports a restricted set of operations, relative to an operating system of the non-secure zone 104. The media device 102 may use the secured OS kernel, dedicated watchdog hardware, and other techniques to tightly control access to memory or other devices while operating with the secure zone 106. Data stored by the non-secure zone 104 may not be subject to such rigid controls, and may be subject to compromise such as attack, copying, modification, and so forth. To improve security, in some implementations the secure zone 106 may be stateless. When operated in the stateless mode, data from previous operations is not stored, accessible, or used by current operations. In comparison, the non-secure zone 104 may be stateful and retain information in memory for later use and retrieval. Stateless operation provides various security benefits, including eliminating the ability for malicious code to store data and interact with other processes. The secure zone 106 may thus be configured to purge memory between different operations, erasing any state information accrued during operation.

The non-secure zone 104 may execute an operating system which is not deemed secure. For example, the non-secure operating system may be based at least in part on the Android® operating system by Google, Inc. of Mountain View, Calif.

The media device 102 may implement the secure zone 106 using architectures or technologies to provide one or more of secure execution, secure memory, or hardware to support secure execution and secure memory. For example, the hardware may comprise dedicated or specialized buses used to transfer information between secure memory locations, devices such as decryption hardware, and so forth.

In one implementation, the media device 102 may be based at least in part on an architecture implementing at least a portion of the ARM® TrustZone® Technology from ARM Holdings PLC of Cambridge, England. For example, the media device may incorporate an ARM Cortex™-A8, Cortex™-A9, Cortex™-A9 MPCore™, and forth. In this implementation, the secure zone 106 corresponds to the "Secure world" of the TrustZone® and the non-secure zone 104 corresponds to the "Normal world" of the TrustZone®.

In other implementations, the architectures may include, but are not limited to those from: MIPS Technologies Inc. of Sunnyvale, Calif.; VideoCore from Broadcom Corp. of Irvine, Calif.; Intel Corp. of Santa Clara, Calif.; Trusted Platform Module (TPM) as codified by ISO/IEC 11889, and so forth. For example, the media device 102 may implement the ARM® TrustZone® as well as any other secure memory firewalling technology, such as that used by VideoCore.

The media device 102 may be configured with one or more communication interfaces allowing the media device 102 to communicate with one or more networks 108. For example, the communication interface may allow for connection to the Internet. The network 108 in turn may couple to a content server 110. The content server 110 comprises one or more computing devices configured to execute a content delivery module 112. The content delivery module 112 may be implemented as a web server configured to deliver encrypted content 114 to the media device 102 by way of the network 108. For example, the media device 102 may request a particular movie from the content server 110 and receive a streaming transmission of the encrypted content 114 which is the movie. The encrypted content 114 comprises content which has been cryptographically encoded, such as to implement digital rights management (DRM). In some implementations the encrypted content 114 may comprise content which has been encrypted prior to transmission, during transmission (such as with an encrypted connection), or both, such as by encrypting the content with one key prior to transmission and encrypting the transmitted data by encrypting with another key.

The network 108 may also connect to a license server 116. The license server 116 includes a license module 118 which responds to requests from the content server 110 or the media device 102 to provide cryptographic content encryption keys (also known as session keys) to the media device 102. The license module 118 may be configured to authenticate the user, media device 102, and so forth to control distribution of content encryption keys. The content encryption key allows the media device 102 to decrypt the encrypted content 114 for presentation. To safeguard the content encryption key from theft or inadvertent use, the content encryption key may be encrypted to form an encrypted key 120. The encrypted key 120 may include a key value to encode or decode, compliant with AES as promulgated by NIST, a hash-based message authentication code (HMAC), a key value compliant with AES Key Wrap Specification standard as promulgated by the NIST, or other sensitive information. The encrypted key 120 may then be transmitted to the media device 102 for use via the network 108.

In some implementations, the media device 102 may also receive additional keys or other sensitive information which is encrypted, such as from a key provisioning server 122 coupled to the network 108. The key provisioning server 122 may include a key distribution module 124 configured to control distribution of other encrypted keys 126. For example, the key provisioning server 122 may provide for field provisioning of additional encrypted keys 126 to the media device 102. Unless otherwise indicated, the encrypted key 120 or 126 as referenced herein as individual keys may include the other. For example, where an operation on the encrypted key 120 is discussed without limitation, the operation may be formed instead, or in addition to, the encrypted key 126.

While this disclosure discusses key distribution via the network 108, in some implementations other means of data transport may be used. For example, the encrypted keys 120 may be stored to computer-readable storage media which may then be used to transfer the information.

As described above, the media device 102 includes the non-secure zone 104 and the secure zone 106. The non-secure zone 104 may include one or more application modules 128 and non-secure zone data 130. The non-secure zone data 130 may include one or more of encrypted content 114, encrypted keys 120, JavaScript Object Notation (JSON) Web Encryption (JWE) (or other format) data objects 132, decrypt context 134, and so forth.

The application module 128 may be a native application, a markup language application, or a hybrid application. Native applications may be written in a language such as C or C++ and are compiled to executables for operation on the particular hardware architecture of the media device 102. For example, a native application compiled to execute on an ARM-based processor may not properly execute on an Intel-based processor.

In comparison, a browser application (which itself may be a native application) processes the markup language instructions to provide desired functionality. The browser application may include Internet Explorer from Microsoft Corp., Chrome from Google Inc., WebKit and WebKit derivatives and forks, Mozilla Firefox from Mozilla Corp., and so forth. The browser application may include various modules or functions including rendering modules, scripting modules, and so forth. The browser application is described in more detail below with regard to FIG. 2.

The markup language application may be expressed using tags and other constructs which are compliant with at least a portion of hypertext markup language revision 5 (HTML5) or subsequent as promulgated by the W3C. The HTML5 application may include scripts to provide various functionality. The scripts may be expressed using JavaScript (JS), ECMAScript as standardized by the ECMA-262 specification and ISO/IEC 16262, and so forth.

Compared to native applications, markup language applications are typically easier to deploy across different media devices, may be simpler to maintain, and so forth. For example, software developers may provide a browser application which is HTML5 compliant as a native application for different media devices 102. Once the browser application is available for a media device 102, subsequent software developers may write a single HTML5 application and distribute this for use on browser applications across many different media devices 102 with different hardware or software architectures.

The encrypted content 114 comprises information which has been cryptographically secured to enforce digital rights management. The encrypted content 114 may be sent to the media device 102 as a complete file or package prior to use, or may be streamed to the media device 102 in portions such that presentation or access to the encrypted content 114 may begin without waiting for the complete file to be downloaded.

The encrypted content 114 and the encrypted keys 120 and 126 may be generated by applying one or more cryptographic algorithms to unencrypted (or "cleartext" or "plaintext") input to generate encrypted (or "ciphertext") output. These algorithms may include the Advanced Encryption Standard (AES) as promulgated by NIST including AES cipher-block chaining (AES-CBC), AES Galois/Counter Mode (AES-GCM), AES Key Wrap (AES-KW), and so forth. Other algorithms such as hash-based message authentication codes (HMAC), the Simple Hash Algorithms (SHA) including SHA256, simple public-key infrastructure (SPKI), and so forth may also be used. For example, the encrypted content 114 may be encrypted with the AES-CBC while the encrypted keys 120 are wrapped and encrypted using AES-KW and AES-GCM128 and are digitally signed using HMAC SHA256.

One or more data objects such as the JWE object 132 may be stored and accessible by the non-secure zone 104. These data objects 132 comprise information about the encrypted keys, and in some implementations may encapsulate the encrypted keys 120, include details about the encryption algorithm used, and so forth. In one implementation the data object 132 may be expressed as a JavaScript Object Notation (JSON) Web Encryption (JWE) object compliant with at least a portion of the JSON Web Encryption standards promulgated by the Internet Engineering Task Force (IETF). Likewise, the JWK objects may be compliant with the JSON Web Key standards promulgated by the IETF. For example, the data object 132 using the JWE specification may include a header, the encrypted key 120 or 126 (such as the content encryption key), an integrity value (also known as an "authentication tag"), an initialization vector, and ciphertext which may include other encrypted keys 120 or 126.

Also stored by the non-secure zone 104 is decrypt context 134 information. The decrypt context 134 comprises data indicative of a binding between a key (or other license data) which is stored by the secure zone 106 as described below and one or more of the non-secure zone 104 processes which are running. The decrypt context 134 may be used to configure the secure zone 106 for decryption of the encrypted content 114. The decrypt context 134 may include a session identifier, a universally unique identifier (UUID), content protection header, key identifier, and so forth. Use of the decrypt context 134 is described below with regard to FIG. 4.

The secure zone 106 may include a secure zone application module 136 and secure zone data 138. The secure zone data 138 may include one or more of decrypted content 140, decrypted key(s) 142, a JSON Web Key (JWK) object 144, pre-provisioned persistent key 146, other encrypted keys 148, and so forth.

The secure zone application module 136 is configured to perform one or more operations by the secure zone 106. For example, the secure zone application module 136 may provide for non-cryptographic operations such as base64 conversion, cryptographic operations such as encryption and decryption, and so forth.

The decrypted content 140 comprises the cleartext result of the secure zone application module 136 decrypting the encrypted content 114 using the encrypted key 120. The decrypted key 142 comprises the encrypted key 120 as provided in cleartext, such as resulting from key unwrap and decryption. The secure zone application module 136 may use the decrypted key 142 for cryptographic operations with the secure zone 106.

In some implementations the keys may be represented as the JSON Web Key (JWK) 144. The JWK 144 may be compliant with at least a portion of the JSON Web Key standards promulgated by the IETF. The JWK 144 may include a key value as well as information representative of properties of the key. The secure zone application module 136 may be configured to generate the JWK 144 from information received from the non-secure zone 104. For example, the encrypted key 120 may be sent to the secure zone 106 for processing by the secure zone application module 136 to generate the JWK 144 for further cryptographic use.

As described above, the secure zone 106 may be stateless. As a result, information such as the decrypted content 140, decrypted keys 142, JWKs 144, and so forth may be purged from the secure zone 106. Traditionally, such a purge would result in the application module 128 of the non-secure zone 104 making a new request for the encryption keys 120 from the license server 116, a process which consumes time and resources.

Due to memory constraints of the secure zone 106, in the interest of improving security by minimizing elements operated by the secure zone 106 which are not in use, or for other reasons, the secure zone application module 136 may be configured to encrypt and store information. In one implementation, the JWK 144 containing cleartext cryptographic information such as the decrypted key 142 may be encrypted using a different key value (such as a pre-provisioned persistent key (PPPK) 146) to form an encrypted key 148. The PPPK 146 may include factory- or manufacturer-provisioned keys which may be stored in the media device 102 during manufacture of the media device 102 or components used therein, order fulfillment, and so forth. The PPPK 146 may be physically encoded or stored in nonvolatile memory which retains information without application of external power or a refresh. For example, the PPPK 146 may be stored using programmable read-only memory (PROM), field programmable read-only memory (FPROM), one-time programmable non-volatile memory (OTP NVM), and so forth.

The PPPK 146 is accessible only by the secure zone 106. Once encrypted with the PPPK 146, the encrypted key 148 may be transferred to the non-secure zone 104 for storage. Subsequently, should the application module 128 need to decrypt encrypted content 114, the appropriate encrypted key 148 is retrieved and provided to the secure zone 106 and the decrypted key (cleartext) 142 is restored for use.

For example, consider where the application module 128 comprises an HTML5 application configured to present encrypted content 114 streamed from a content server 110. A user of the media device 102 may begin playback of the encrypted content 114, acquiring the appropriate keys to decrypt the encrypted content 114. The user may stop playback and close the application module 128. Responsive to this, the secure zone 106 may store the encrypted key 148 in memory designated for use by the non-secure zone 104 and then flush or purge the secure zone 106. Later, the user executes the HTML5 application again, and seeks to begin playback of the content. Because the encrypted key 148 has been previously stored locally on the media device 102, the HTML5 application is able to retrieve the encrypted key 148 and provide the encrypted key 148 to the secure zone 106 without having to communicate with the license server 116. As a result, the user experiences presentation of the content beginning more quickly without a delay involved in contacting the license server 116.

For ease of illustration and not by way of limitation, the examples in this disclosure generally describe processing of a single key. However, the techniques described herein are applicable to a plurality of keys, or other data which may need to be secured cryptographically such as a hash, signature, and so forth. For example, content servers 110 may use multiple keys to encrypt different portions of the content, resulting in the use of corresponding multiple decryption keys. Furthermore, in some implementations different keys may be acquired from different parties to facilitate decryption. For example, the content may be wrapped in multiple layers of encryption, each layer having a key associated with a different party.

Figure 2:
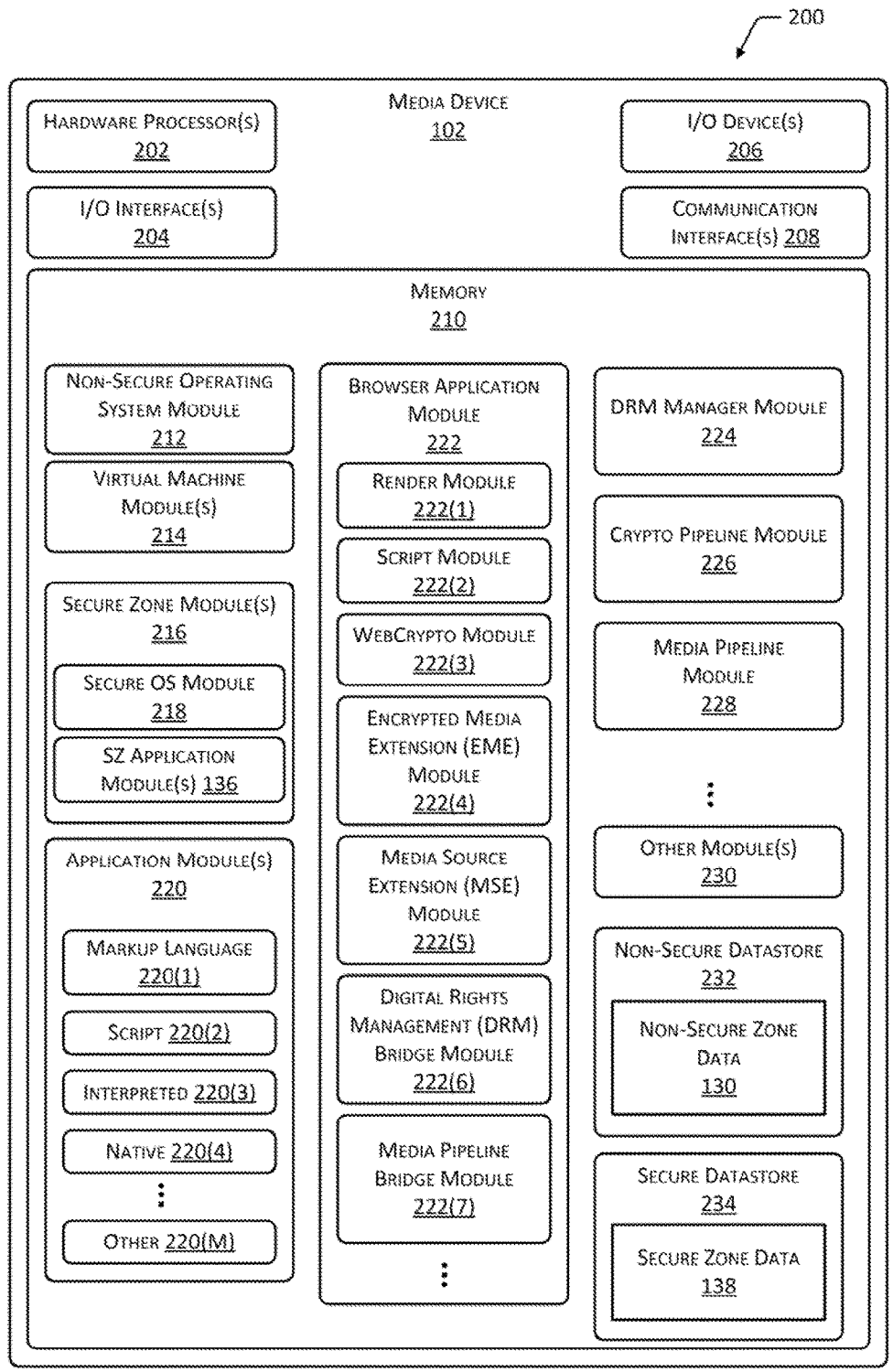
FIG. 2 is a block diagram of the media device.

FIG. 2 illustrates a block diagram 200 of the media device 102. The media device 102 may include one or more hardware processors 202 (processors) configured to execute one or more stored instructions. The processors 202 may comprise one or more cores. In one implementation, the processors 202 may be configured to provide the non-secure zone 104 and the secure zone 106, either exclusively one or the other, or both simultaneously. In some implementations, one or more of the processors 202 may be dedicated to handle cryptographic or otherwise process highly sensitive data. For example, the media device 102 may include a dedicated secure cryptoprocessor.

The media device 102 may include one or more input/output (I/O) interface(s) 204 to allow the processor 202 or other portions of the media device 102 to communicate with peripheral or other devices. The I/O interfaces 204 may comprise inter-integrated circuit (I2C), serial peripheral interface bus (SPI), Universal Serial Bus (USB) as promulgated by the USB Implementers Forum, RS-232, one or more media device interfaces such as High Definition Multimedia Interface (HDMI) as promulgated by HDMI Licensing LLC, TOSLINK as promulgated by Toshiba Corp., analog video, analog audio, IEEE 2394 as promulgated by the Institute for Electrical and Electronics Engineers, and so forth.

The I/O interface(s) 204 may couple to one or more I/O devices 206. The I/O devices 206 may include input devices such as one or more of a camera, a microphone, a touch sensor, a button, range camera, fingerprint reader, accelerometer, gyroscope, magnetometer, tilt sensor, and so forth. The I/O devices 206 may also include output devices such as one or more of a display, audio speakers, haptic output device and so forth. In some embodiments, the I/O devices 206 may be physically incorporated with the media device 102 or may be externally placed.

The media device 102 may also include one or more communication interfaces 208. The communication interfaces 208 are configured to provide communications between the media device 102 and other devices, such as other media devices 102, routers, access points, the content server 110, the license server 116, the key provisioning server 122, and so forth. The communication interfaces 208 may be configured to couple with wires or wirelessly to one or more personal area networks (PANs), local area network(s) (LANs), wide area networks (WANs), and so forth. For example, the communication interfaces 208 may be configured to use Ethernet, Wi-Fi™, Bluetooth®, ZigBee®, and so forth.

The media device 102 may also include one or more busses or other internal communications hardware or software that allow for the transfer of data between the various modules and components of the media device 102.

As shown in FIG. 2, the media device 102 includes one or more memories 210. The memory 210 comprises one or more computer-readable storage media (CRSM). The CRSM may be any one or more of an electronic storage medium, a magnetic storage medium, an optical storage medium, a quantum storage medium, a mechanical computer storage medium and so forth. The memory 210 provides storage of computer readable instructions, data structures, program modules and other data for the operation of the media device 102.

The memory 210 may include a non-secure operating system (OS) module 212. The non-secure OS module 212 is configured to manage hardware resource devices such as the I/O interfaces 204, the I/O devices 206, the communication interfaces 208, and provide various services to applications or modules executing on the processors 202. The non-secure OS module 212 may implement a variation of the Linux operating system, such as Android® as promulgated by Google, Inc. Other operating systems may be used, such as the iOS operating system from Apple, Inc., the Windows® or Windows Phone® operating systems from Microsoft Corporation, the LynxOS® from Lynx Software Technologies, and so forth.

Also stored in the memory 210 may be one or more of the following modules. These modules may be executed as foreground applications, background tasks, daemons, and so forth. These modules may comprise executables, classes, libraries, markup language, and so forth. The modules are configured to provide one or more functions when executed by the processor 202.

A virtual machine (VM) module 214 in the memory 210 provides functionality to execute applications on the processors 202 which use an interpreted language as compiled to a bytecode. The virtual machine module 214 is configured to execute the bytecode and provide the functionality set forth in the bytecode. The virtual machine module 214 may be configured to provide various functions such as virtual memory control, garbage collection, and so forth. For example, the virtual machine module 214 may comprise the Dalvik virtual machine (or derivatives) executing by the non-secure operating system module 212 of Android®. Execution of interpreted language applications by the VM module 214 may convey security benefits. For example, the effects of malicious or poorly written code may be confined to the VM module 214, rather than affecting the entire non-secure OS 212. As described below, in some implementations an interpreted crypto application module, such as WebCrypto, may be used to support functionality between a markup language application and the secure zone application module 136. To execute the interpreted application the VM module 214 instantiates a virtual machine, within which the interpreted application is then executed.

The media device 102 may include in the memory one or more secure zone modules 216. The secure zone modules 216 may include a secure OS module 218 and the secure zone application module(s) 136. The secure zone modules 216 are configured to provide the functionality associated with maintaining and performing operations by the secure zone 106. For example, the secure OS module 218 may comprise a secure OS kernel configured to implement at least a portion of the ARM TrustZone®.

One or more application modules 220 may be stored in the memory. These applications may include markup language applications 220(1), scripts 220(2), interpreted applications 220(3), native applications 220(4), or other applications 220(M) such as a hybrid markup and native application.

As described above, the markup language application 220(1) may be expressed using tags and other constructs which are compliant with at least a portion of hypertext markup language revision 5 (HTML5) or subsequent as promulgated by the W3C. The markup language application 220(1) may be executed using a browser application module as described below.

The scripts 220(2) may be expressed using JavaScript, ECMAScript as standardized by the ECMA-262 specification and ISO/IEC 16262, TypeScript from Microsoft Corp., Dart from Google Inc., and so forth. The script 220(2) may be executed using the browser application module as described below.

The interpreted applications 220(3) may include those coded in Java as promulgated by Oracle Corporation, Common Intermediate Language as promulgated by Microsoft Corp, and so forth. To execute the interpreted application 220(3), the VM module 214 instantiates a virtual machine and proceeds to process code of the interpreted application 220(3), such as bytecode.

The native applications 220(4) are those compiled to execute on the hardware of the media device 102. For example, the browser application module described next may be a native application 220(4).

A browser application module 222 is configured to process markup language, such as in a markup language application 220(1) and may also provide functionality to process scripts 220(2). The browser application module 222 may include Internet Explorer from Microsoft Corp., Chrome from Google Inc., WebKit and WebKit derivatives and forks, Mozilla Firefox from Mozilla Corp., and so forth.

The browser application module 222 may include a rendering module 222(1) configured to process markup language such as the markup language application 220(1) and present content on an output device such as a display device, speakers, and so forth. For example, the rendering module 222(1) such as the WebCore promulgated by Apple Corp. may process tags in the markup language to present graphic elements in particular positions on the display device.

A script module 222(2) is configured to process the script 220(2) to perform particular functions. For example, the script module 222(2) may comprise the JavaScriptCore promulgated by Apple Corp.

The browser application module 222 may also include, or be able to access, a WebCrypto module 222(3) which implements the WebCrypto Application Programming Interface (API) as promulgated by the W3C. The WebCrypto module 222(3) provides an interface with which the markup language application 220(1), the script 220(2), and so forth may interact with and obtain service from the secure zone 106. In some implementations, the WebCrypto module 222(3) may be implemented as an interpreted application 220(3) which executes within the VM module 214. In some implementations a native application 220(4) of the WebCrypto module 222(3) may execute outside of the browser application module 222. For example, one or more functions of the WebCrypto module 222(3) may be implemented as a service in the non-secure OS module 212.

An Encrypted Media Extension (EME) module 222(4) may also be part of, or accessible to, the browser application module 222. The EME module 222(4) provides an API to control presentation of protected content, such as the encrypted content 114. The EME module 222(4) is compliant with at least a portion of the Encrypted Media Extensions as promulgated by the W3C.

A media source extension (MSE) module 222(5) may also be part of, or accessible to, the browser application module 222. The MSE module 222(5) is configured to allow the browser application module 222 to use script 220(2) to generate media streams for presentation.

A DRM bridge module 222(6) may also be part of, or accessible to, the browser application module 222. The DRM bridge module 222(6) couples the EME module 222(4) to a DRM manager module 224 and a crypto pipeline module 226. Operation of the DRM bridge module 222(6) is described in more detail below with regard to FIG. 4.

The DRM manager module 224 may comprise a portion of the non-secure OS module 212 and provides connectivity between the DRM bridge module 222(6) and the secure zone 106 for management of DRM-protected content, such as the encrypted content 114. The DRM manager module 224 further provides applications the necessary interface to perform DRM operations including, but not limited to, content license management, content decryption using a valid license containing the decryption key, and so forth.

The crypto pipeline module 226 may comprise a portion of the non-secure OS module 212 and provides connectivity between the DRM bridge module 222(6) and the secure zone 106 for cryptographic operations. The crypto pipeline module 226 may provide a securely wrapped reference to a decryption key which may then be used to decrypt the content.

A media pipeline bridge module 222(7) may also be part of, or accessible to, the browser application module 222. The media pipeline bridge module 222(7) is configured to provide connectivity between the MSE module 222(5) and a media pipeline module 228. In one implementation, the media pipeline module 228 may comprise the MediaCodec portion of the non-secure OS module 212. For example, the media pipeline module 228 may comprise a class which may be used to access low-level media codec components, such as encoders and decoders. The low-level media code components may be operable by the secure zone 106.

The browser application module 222 may include or have access to other modules not depicted here. Other modules 230 may also be present in the memory 210. For example, a user authentication module may be configured to acquire biometric information by way of an I/O device 206 and identify a particular user.

The memory 210 may include a non-secure datastore 232 and a secure datastore 234. The non-secure datastore 232 may store the non-secure zone data 130. The secure datastore 234 may store the secure zone data 138. The datastores may use a flat file, database, linked list, tree, executable code, script, or other data structure to store the information. In some implementations, the datastores or a portion thereof may be distributed across one or more other devices including servers, other media devices 102, network attached storage devices, and so forth. In some implementations the non-secure datastore 232 and the secure datastore 234 may implement data structures which are different from one another.

Figure 3:
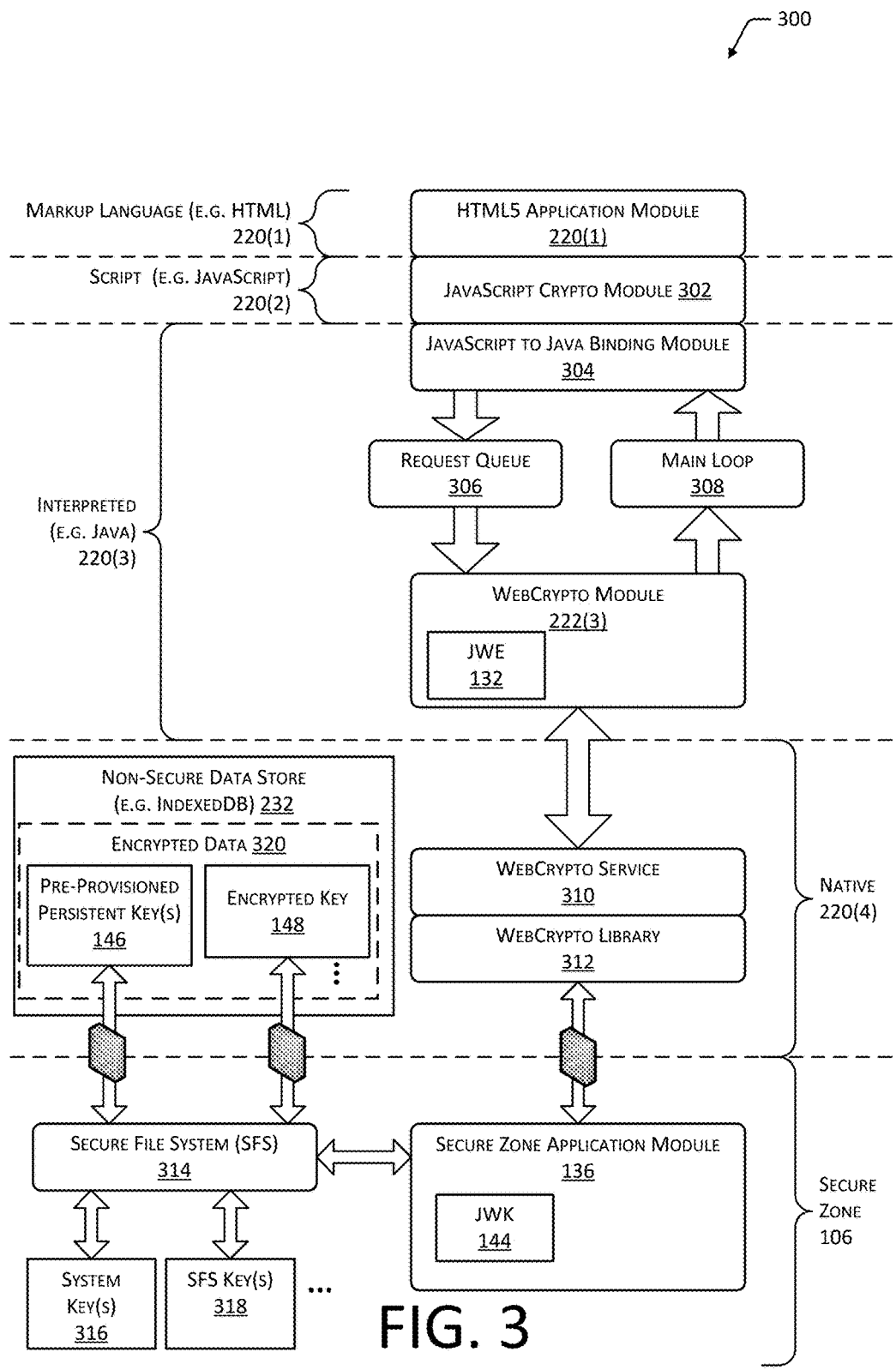
FIG. 3 is a block diagram of an architecture for providing cryptographic functions executed in a secure zone to the markup language application.

FIG. 3 is a block diagram 300 of an architecture for providing cryptographic functions executed by the secure zone 106 to the markup language application 220(1). A markup language application 220(1) is coupled to, or incorporates, a JavaScript (JS) Crypto Module 302. The JS Crypto Module 302 may comprise a script 220(2) expressed as JavaScript which is configured to call for cryptographic operations such as adding keys to the secure zone 106, decrypting content, and so forth.

The JS Crypto Module 302 is in communication with a JavaScript to Java Binding. The JavaScript to Java Binding module 304 binds the operations as called by the JS crypto module 302 to the WebCrypto module 222(3). Communication between the JavaScript to Java Binding module 304 may be facilitated using a request queue 306 and a main loop 308. The request queue 306 may hold requests made by the JS crypto module 302 while the main loop 308 handles execution of tasks associated with those requests.

The WebCrypto module 222(3) may implement the WebCrypto API as promulgated by the W3C. By way of the JavaScript to Java Binding module 304, the WebCrypto module 222(3) provides an interface with which the markup language application 220(1), the script 220(2), and so forth may interact with and obtain service from the secure zone 106. In some implementations the WebCrypto module 222(3) may be implemented as an interpreted application 220(3) which executes within the VM module 214. By executing within the VM module 214, the WebCrypto module 222(3) enjoys several benefits which may enhance security. For example, the virtual machine isolates the interpreted application 220(3) to some extent from the underlying non-secure OS module 212. As a result, should malicious or erroneous code perform operations to improperly access memory or processor resources, errors associated with these operations may be confined to the virtual machine.

The WebCrypto module 222(3) may be configured to begin processing the JWE object 132. This processing may include cryptographic operations which need not be performed by the secure zone 106, such as certain public-key infrastructure operations. Non-cryptographic operations may be performed as well. For example, base64 conversion or decoding of the JWE object 132 to produce a string may be performed, or other parsing may be performed. By performing these operations with the non-secure zone 104, less information, such as data and instructions, is sent to the secure zone 106 for processing reducing the avenues for malicious code to intrude on the secure zone 106.

The WebCrypto module 222(3) is also configured to generate data indicative of the operations as requested by the markup language application 220(1) to be performed by the secure zone 106, and the data associated with performing these requested operations. In one implementation the WebCrypto module 222(3) may be configured to generate a byte array. The byte array may include the encrypted key 120 and data indicative of the operation(s) to be performed, such as key unwrap, preparing for decryption of encrypted content 114, and so forth. In some implementations, the WebCrypto module 222(3) may provide a byte array for which the initial operation by the secure zone 106 is decryption, such as described below.

The WebCrypto module 222(3) sends the byte array or other information to the WebCrypto service 310 which utilizes a WebCrypto Library 312. The WebCrypto service 310 is a native 220(4) application, and may be a part of the non-secure operating system module 212. The WebCrypto library 312 provides functionality which may be called by the WebCrypto service 310, including interaction with applications of the secure zone 106. The WebCrypto service 310 receives information such as the byte array from the WebCrypto module 222(3), and sends this information to the secure zone application module 136.

The secure zone application module 136, executing by the secure zone 106, accepts the information such as the byte array. As a result of the parsing or other processing performed by the WebCrypto module 222(3), in some implementations the first operation performed by the secure zone application module 136 is a decryption operation. For example, the secure zone application module 136 may read information from the byte array which specifies an algorithm and other encryption parameters, as well as accessing the encrypted key 120 to begin unwrapping the encrypted key 120. Should the byte array contain a legitimate encrypted key 120 and parameters for decrypting that key, the resulting decrypted key 142 is produced by the secure zone 106.

Should the byte array contain illegitimately formed information, the decryption will fail. The secure zone 106 may be configured to, upon failure of the decryption, prohibit subsequent operations on this information and may also purge the memory associated with those operations, or of the entire secure zone 106. This prohibition and subsequent purge may reduce the likelihood of the successful malicious attack on the secure zone 106 or information stored therein.

In some implementations the byte array or other information provided to the secure zone application module 136 may include information which, when decrypted by the secure zone 106 requires additional parsing. For example, the decrypted information may need to undergo base64 conversion before additional processing. The secure zone application module 136 may be configured to provide this functionality.

The secure zone application module 136 may use the decrypted key 142 which is in cleartext to generate a JWK 144. The JWK 144 may be used for subsequent operations by the secure zone 106, such as encryption, decryption, signing, and so forth.

The secure zone application module 136 may access a secure file system (SFS) 314. The SFS 314 may be configured to use specialized keys such as system keys 316 and SFS keys 318 to encrypt and store data. These keys are specialized in that they are restricted such that their key values are not intentionally to ever leave the secure zone 106, and special safeguards may be implemented by the secure zone 106 to prevent accidental or malicious extraction of these keys. The system keys 316 may be stored in the media device 102 or particular components thereof at the time of manufacture, integration, or assembly. Knowledge of the system keys 316 may be retained to facilitate future cryptographic communications with that particular device.

For example, should the media device 102 request the encrypted keys 120, the key provisioning server 122 with knowledge of the system key 316 for the particular media device 102 may use the system key 316 to encode a different session key for use by the media device 102 to communication with the license server 116. In this way, the system key 316 value is not disclosed, but cryptographically secure communication between the media device 102 and a third party such as the license server 116 may be established.

The SFS keys 318 may be stored in a chipset or particular set of components thereof at the time of manufacture of that particular component or set of components. For example, the SFS keys 318 may be embedded within a component provided by a sub-assembly manufacturer. As a result, the system keys 316 and the SFS keys 318 may be known by two completely different entities, and may never be known to both. In some implementations, knowledge of the SFS keys 318 may be retained to facilitate future cryptographic communications with that particular component or set of components. However, in other implementations the SFS keys 318 may be unknown to any outsider, including the manufacturer. For example, the SFS 314 may use an SFS key 318 which is generated by the secure zone 106 using a high entropy source to facilitate randomness.

The secure zone application module 136 may use the SFS 314 to encrypt data and store that data outside of the secure zone 106 in the non-secure zone 104. For example, the secure zone application module 136 may send the JWK 144 (in cleartext) to the SFS 314. The SFS 314 may use the SFS key 318 to generate encrypted data 320, such as the PPPK 146 and the encrypted key 148. The encrypted data 320 is now cryptographically secure by way of the SFS key 318, which may be known only to that particular media device 102. The encrypted data 320 may now be safely transferred to the non-secure zone 104 for storage. In the event the encrypted data 320 is compromised, such as having copy stolen and provided to a third party, the information may be considered cryptographically secure against attack. Without detailed knowledge of the SFS key 318 generation, a brute force attack against a possible keyspace of the SFS key 318, or both, the encrypted data 320 may not be accessed.

In one implementation, the secure zone application module 136 may send the encrypted key 148 back up to the WebCrypto Service 310 and thence to the WebCrypto module 222(3), which in turn provides the encrypted key 148 to the markup language application 220(1). The encrypted key 148 may be referenced by a key identifier, which is used to reference that particular encrypted key 148 within the media device 102. The markup language application 220(1) may store the encrypted key 148 in the non-secure zone 104 for later retrieval and usage. For example, the markup language application 220(1) may use the IndexedDB API to store and retrieve the encrypted key 148 from the non-secure data store 232.

The secure zone 106 may purge the JWK 144 which was stored as the encrypted key 148. For example, after the user activates a control in the markup language application module 220(1) to stop presentation of the encrypted content 114 and close the markup language application 220(1), the secure zone 106 may purge all data associated with the markup language application 220(1), removing the associated decrypted key 142. Continuing the example, the user may later restart the markup language application module 220(1) and seek to resume presentation of the encrypted content 114. Instead of requesting the encrypted key 120 from the license server 116, the markup language application 220(1) may retrieve the encrypted key 148 from the non-secure data store 232. The markup language application 220(1) may use the JS crypto module 302 to send the encrypted key 148 down to the secure zone application module 136. The secure zone application module 136 decrypts the encrypted key 148 using the SFS key 318, and provides the JWK 144 for subsequent use in decrypting the encrypted content 114.

Another advantage conveyed by storing information in the encrypted data 320 rather than using the secure zone 106 is increased security to the information therein. By minimizing the amount of information present in memory designated for use by the secure zone 106 at any given time, information loss or corruption due to malicious activity is reduced. For example, should malicious code be executed by the secure zone 106, given the stateless nature of the secure zone 106, information breached would not include the information which has been previously offloaded as encrypted data 320 to the non-secure zone 104.

Figure 4:
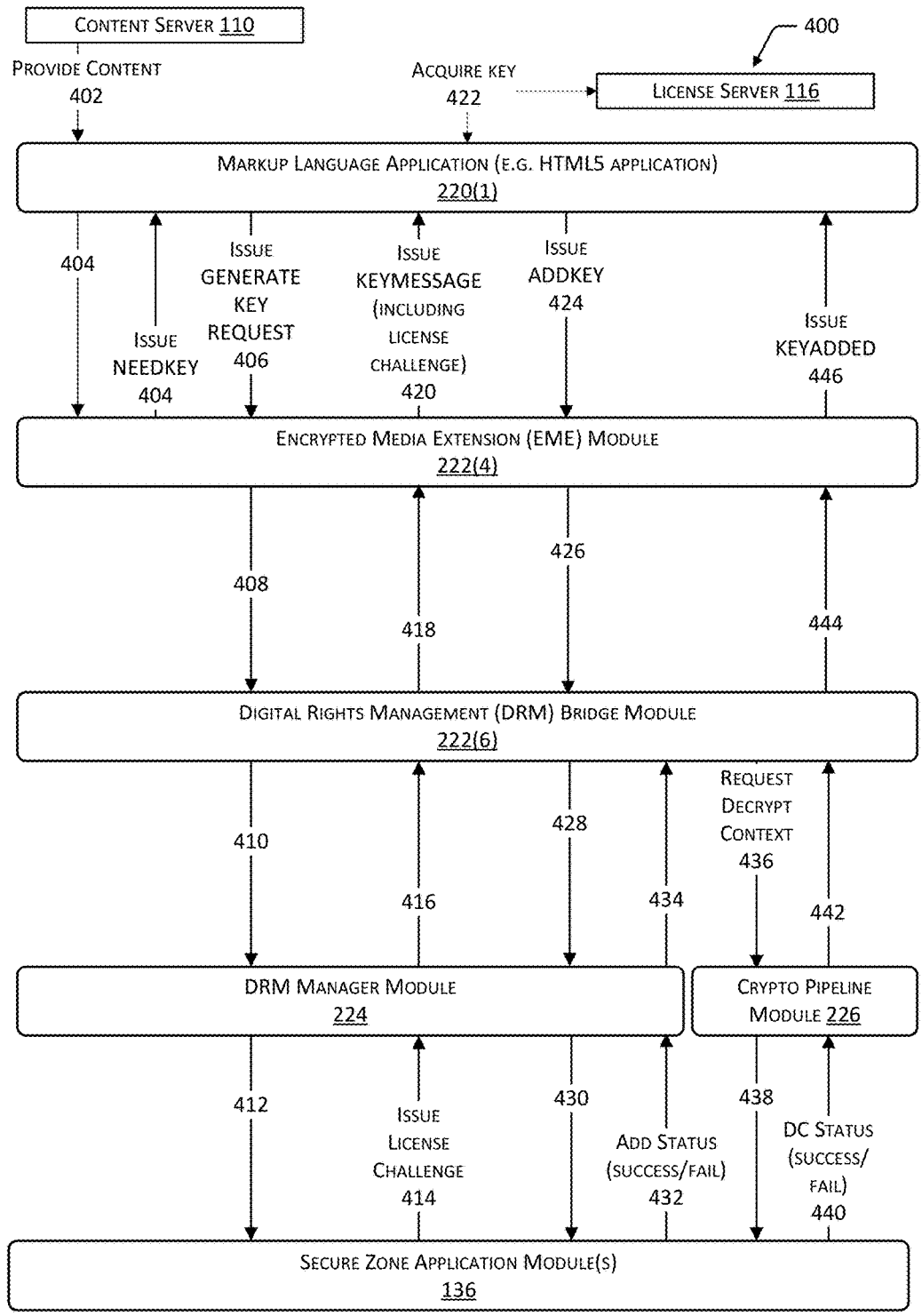
FIG. 4 illustrates data flows between modules executing on the media device to provision keys for decryption of the encrypted content.

FIG. 4 illustrates data flows 400 between modules executing on the media device 102 to provision keys for decryption of the encrypted content 114. This illustration depicts the flows associated with operation on the media device 102 as executing the non-secure OS 212, such as the Android® OS or derivatives thereof.

As described above, at 402 the content server 110 provides encrypted content 114 to the markup language application 220(1). At 404 the markup language application 220(1) provides the encrypted content 114 to the EME module 222(4) for presentation. At 404, the EME module 222(4) determines that the key needed to decrypt the encrypted content 114 is unavailable, and issues a "NEEDKEY" event. Responsive to the "NEEDKEY" event, at 406 the markup language application 220(1) issues a generate key request to the EME module 222(4). At 408 the EME module 222(4) sends the request to the DRM Bridge module 222(6). As used in this disclosure, the act of sending or sending information between the modules may include conversion, translation, reformatting, or other operations which may change the data from an initial state to a final state. For example a string of "generate key request" may be translated to "op39" while being sent from one module to another. However, the data represented by the information maintains a consistent meaning, such as "generate a key request".

At 410 the DRM Bridge module 222(6) in turn sends the request to the DRM Manager module 224. At 412 the DRM manager module 224 in turn sends the request to the secure zone application module 136.

The secure zone application module 136 processes the generate key request, and at 414 issues a license challenge to the DRM manager 224. At 416 the DRM manager 224 sends the license challenge at to the DRM bridge module 222(6), which in turn at 418 sends the license challenge to the EME module 222(4).

The EME module 222(4) may process the license challenge and at 420 issues a "KEYMESSAGE" to the markup language application 220(1). The KEYMESSAGE contains the license challenge and a session identifier. The session identifier uniquely identifies a key session. The session identifier may be as described in the EME specification as promulgated by the W3C. The session identifier (session ID) may be a unique string identifier which identifies MediaKeySession objects. A new session ID may be generated each time a user agent successfully initializes a MediaKeySession object. The session ID may be unique within a browsing context in which it has been created, or may be unique across browsing session.

At 422, the markup language application 220(1) sends the KEYMESSAGE along to a license server 116 and acquires the encrypted key 120. In some implementations, the markup language application 220(1) may use one or more functions of the WebCrypto module 222(3) to obtain the encrypted key 120. In other implementations, the markup language application 220(1) may obtain the encrypted key 120 by implementing protocols coded into the markup language application 220(1) itself.

Now possessing the encrypted key 120, at 424 the markup language application 220(1) issues an "ADDKEY" event to the EME module 222(4). The ADDKEY event includes the encrypted key 120, the session ID, and other information such as the key system used, initialization data, and so forth. The key system may comprise a string which identifies a particular DRM technology, or key system which is used with the key. The initialization data may comprise a Content Protection Header, or other information expressed using Extensible Markup Language (XML). At 426 the EME module 222(4) sends the event to the DRM Bridge module 222(6). At 428 the DRM Bridge module 222(6) in turn sends the event to the DRM Manager module 224. At 430 the DRM manager module 224 in turn sends the event to the secure zone application module 136.

The secure zone application module 136 processes the ADDKEY event. This processing may include that described above with regard to FIG. 3, including decryption of the encrypted key 120 to generate the decrypted key 142, creation of a JWK 144, and so forth. At 432, the secure zone application module 136 may issue an "ADD STATUS" message to the DRM manager module 224. The ADD STATUS message may indicate success or failure of the secure zone application module 136 to successfully decrypt the encrypted key 120 and setup for decryption of the encrypted content 114. In this illustration, the ADD STATUS is assumed to indicate success.

At 434 the DRM manager module 224 sends the ADD STATUS message to the DRM bridge module 222(6). Responsive to the ADD STATUS indicating success, at 436 the DRM bridge module 222(6) requests the crypto pipeline module 226 to generate the decrypt context 132. The crypto pipeline module 226, responsive to the request, generates the decrypt context 134. As described above, the decrypt context 134 may include a session identifier, a UUID, content protection header, key identifier, and so forth. The decrypt context 134 provides a binding between the markup language application 220(1) and the encrypted key 120 which allows the markup language application 220(1) to configure the secure zone application module 136 to decrypt using a particular encrypted key 120. By using the decrypt context 134, the binding may be maintained without compromising key values.

At 438 the crypto pipeline module 226 sends the decrypt context 134 to the secure zone application module 136. The secure zone application module 136 may use the decrypt context 134 to setup for a cryptographic operation, associate the decrypted key 142 with the key identifier, for generation of a JWK 144, and so forth. At 440 the secure zone application module 136 issues a "DC STATUS" event to the crypto pipeline module 226. The DC STATUS indicates whether the decrypt context 134 was successfully processed by the secure application module 136 and is available for use. In this illustration the DC STATUS indicates success. At 442 the crypto pipeline module 226 sends the DC STATUS to the DRM bridge module 222(6). At 444 the DRM bridge module 222(6) sends the DC STATUS to the EME module 222(4). The EME module 222(4) processes the DC STATUS indicating success, and at 446 issues a KEYADDED event to the markup language application 220(1). The KEYADDED event provides the markup language application 220(1) with information indicating that the encryption key 120 is stored in memory designated for use by the secure zone application module 136 and ready for use, such as in decrypting the encrypted content 114.

In addition to the generate key request, the EME module 222(4) may support other messages notifications. For example, a cancel key request may be generated which signals other modules to discontinue processing a previously issued generate key request.

The EME module 222(4) may also provide information about other events, such as a key error event. The key error event indicates there is an error from another module.

As used in this disclosure, the act of sending or sending information between the modules may include conversion, translation, reformatting, or other operations which may change the data from an initial state to a final state. For example, a byte array may be reformatted by one module into a JSON object for sending on to the next module. In another example a string of "generate key request" may be translated to "op39". However, the data represented by the information maintains a consistent meaning, such as "generate a key request".

Illustrative Processes

In some implementations the following processes may be executed at least in part on an architecture implementing at least a portion of the ARM® TrustZone® Technology and executing the non-secure OS module 212 of Android®. The virtual machine module 214 may be based at least in part on the Dalvik process virtual machine. In other implementations, other architectures which offer non-secure zone 104 and secure zone 106 operation may be utilized. Likewise, other operating systems such as iOS, Windows®, Windows Phone®, LynxOS®, and so forth may also be used.

The operation of the architecture may include hardware and software configured to segregate portions of memory for use by the non-secure zone 104, the secure zone 106, or both. The secure zone 106 may permit or support operations using a restricted subset or a different set of operations than those provided in the non-secure zone 104. For example, the secure zone 106 may not permit particular memory operations which are allowed in the non-secure zone 104. The media device 102 may be configured to provide the non-secure zone 104 and the secure zone 106 simultaneously (both zones available contemporaneously), or sequentially (one zone at a time). In some implementations, a first operating system such as the non-secure OS module 212 may execute in the non-secure zone 104 while a second operating system such as the secure OS module 218 may execute by the secure zone 106. In some implementations the secure OS module 218 may be a derivative of, or modified version of the non-secure OS module 212.

Figure 5:
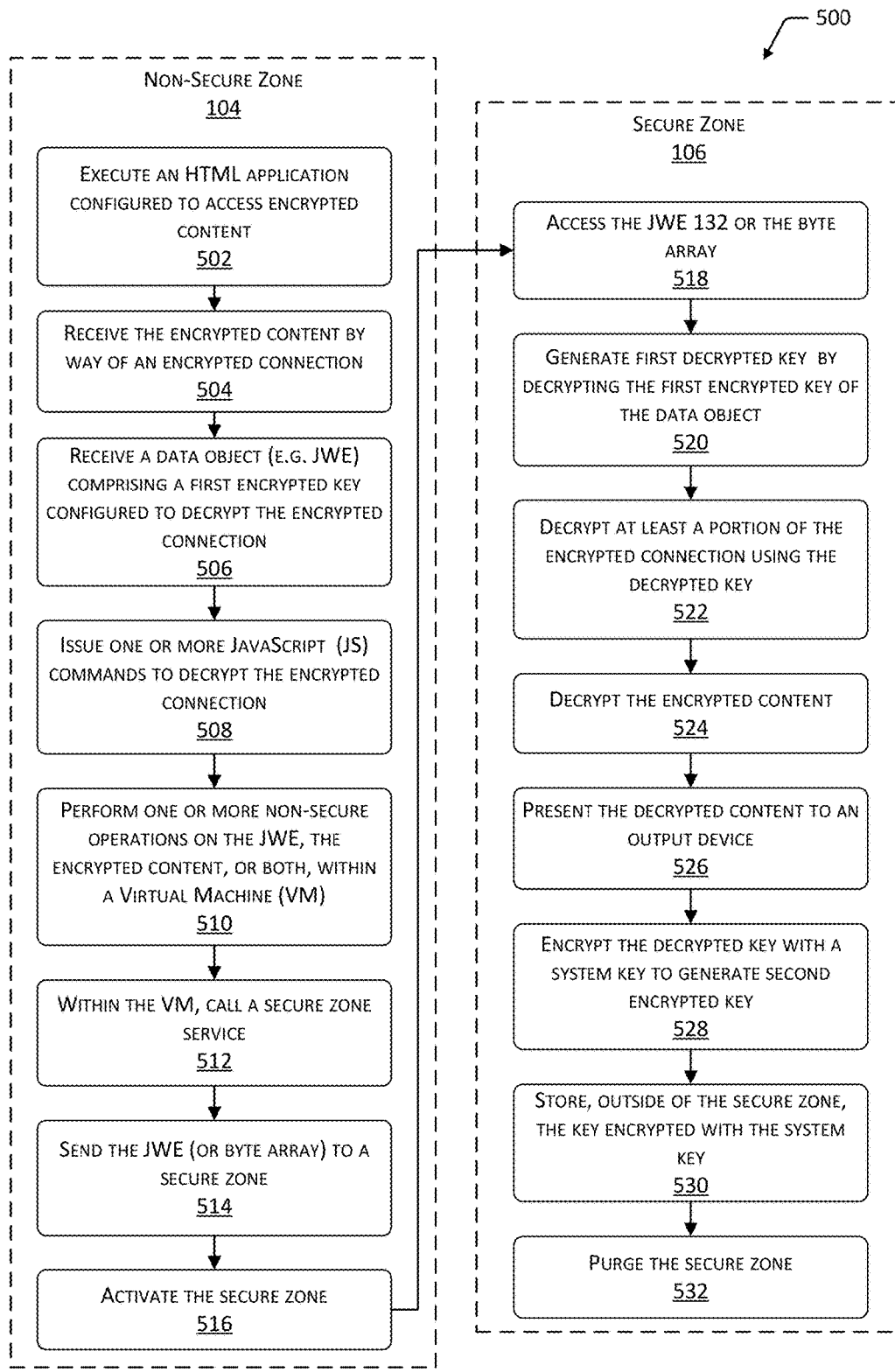
FIG. 5 is a flow diagram of a process of presenting encrypted content using the markup language application and a secure zone.

FIG. 5 is a flow diagram 500 of a process of presenting encrypted content 114 using the markup language application 220(1) and the secure zone 106. Blocks 502 through 516 may operate using the non-secure zone 104, while blocks 518 through 532 may operate using the secure zone 106.

In some implementations the media device 102 is configured to operate the non-secure zone 104 by limiting processes of the non-secure zone 104 in their access to a first set of one or more memory locations. For example, a particular set of memory addresses may be designated for use by the non-secure zone 104. The non-secure zone 104 may also provide a first set of non-secure operations for execution on the processor 202. For example, these non-secure operations may include instructions for processing integer numbers.

The media device 102 may be configured to operate the secure zone 106 by limiting processes of the secure zone 106 in their access to a second set of one or more memory locations. For example, the data stored in the first set of memory locations may be inaccessible to the secure zone 106, while the data stored in the second set of memory locations may be inaccessible to the non-secure zone 104. The secure zone 106 may also provide a second set of cryptographic operations for execution on the processor 202. The second set differs from the first. For example, while in the secure zone 106 a particular cryptographic operation may be called, while that same cryptographic operation may be inaccessible for the media device 102 operating in the non-secure zone 106.

Access to one or more components of the media device 102 may also be restricted or limited based on the operable zone. For example, while operating with the secure zone 106, access to dedicated decryption logic within the processor 202 may be enabled while data transfer to a USB device may be disabled.

Block 502 executes a markup language application 220(1). For example, the markup language application 220(1) may comprise an application coded in hypertext markup language revision 5 (HTML5) or subsequent. The markup language application 220(1) may be configured to present encrypted content 114. For example, the HTML5 application may be configured to stream video content from the content server 110 and present it on a display device.

Block 504 receives the encrypted content 114. For example, the media device 102 may receive the encrypted content 114 using the communication interface 208. The encrypted content 114 may include content encrypted prior to transmission, data including the content which is transferred by way of an encrypted connection, or data including previously encrypted content which is transferred by way of an encrypted connection.

Block 506 receives a data object, such as the JWE object 132 comprising the encrypted key 120. The encrypted key 120 contains a key value which is configured to decrypt the encrypted content 114. For example, the encrypted key 120 may comprise a key used to decrypt the data transferred by the encrypted connection.

Block 508 issues, from the markup language application 220(1), one or more script 220(2) instructions to decrypt the encrypted content 114 for presentation on the display device. For example, the HTML5 application may be configured to play audio or video content streamed from a server.

Block 510 performs one or more non-secure operations on the JWE object 132 within the virtual machine module 214. The non-secure operations comprise functions which do not involve confidential or cryptographically sensitive information, such as cleartext of keys. In one example, the non-secure operation may include base64 conversion of at least a portion of the JWE object 132 from a format used during distribution to a string. Other non-secure operations may include generating the byte array at least in part by parsing header information stored in the JWE 132 object, public key verification, and so forth.

Block 512 calls, from within the VM module 214, the secure zone service to provide one or more cryptographic operations by the secure zone 106. For example, the WebCrypto module 222(3) may call the WebCrypto service 310 to decrypt content.

Block 514 sends the JWE 132 object, or data resulting from the processing by the VM module 214 such as the byte array, to the secure zone 106. If not already active, block 516 activates the secure zone 106.

Block 518 accesses the JWE 132 object, the byte array, or other data from the WebCrypto service 310. Block 520 generates the decrypted key 142 by decrypting the encrypted key 120 stored in the JWE 132 object or byte array. For example, block 520 may apply the AES-KW key unwrap operation.

Block 522 generates decrypted content 140 by decrypting at least a portion of the encrypted content 114 using the decrypted key 142. For example, the block may decrypt at least a portion of the encrypted connection using the decrypted key 142. In one implementation, block 522 may use an AES decrypt operation to decrypt the encrypted content 114 as streamed from a server or retrieved from memory.

In implementations where the encrypted content 114 comprises content which has been encrypted prior to transfer and which is then transmitted by way of the encrypted connection, block 524 further decrypts the encrypted content 114 which was sent using the encrypted connection. This additional decryption may use a different key value than that used for the encrypted connection.

Block 526 presents the decrypted content 140 to an output device, such as the display device. Because the decryption and presentation takes place using the secure zone 106 digital rights may be maintained to prevent unauthorized copying or manipulation of the content as presented.

Block 528 encrypts the decrypted key 142. This encryption may use the system key 316 to generate the encrypted key 148. As described above, the system key 316 is accessible only while operating using the secure zone 106. Once encrypted with the system keys 316, or other keys which are known to a limited set of parties, the encrypted key 148 or other information such as the PPPK 146 may be stored outside of the secure zone 106.

Block 530 sends the encrypted key 148 to the non-secure zone 104 for storage. For example, the encrypted key 148 may be sent to the markup language application 220(1), which may then store the encrypted key 148. Because the encrypted key 148 or other encrypted data 320 is encrypted using the system key 316 or other keys having limited or no distribution, they may be considered cryptographically secure.

With the decryption of the encrypted content 114 completes and the encrypted key 148 is stored in the non-secure data store 232 in the non-secure zone 104, block 532 may purge, deactivate, re-initialize, or otherwise discontinue or reset the state of the secure zone 106. For example, the state information of the secure zone application module 136 may be erased, as well as JWK 144, decrypted key 142, and so forth.

At a later time, as described above, should the markup language application 220(1) need to use the encrypted key 148, it may be retrieved from the non-secure data store 232, and sent to the secure zone 106. The secure zone 106 may then decrypt the encrypted key 148 and be setup for performing cryptographic operations using the decrypted key 142 (cleartext).

Figure 6:
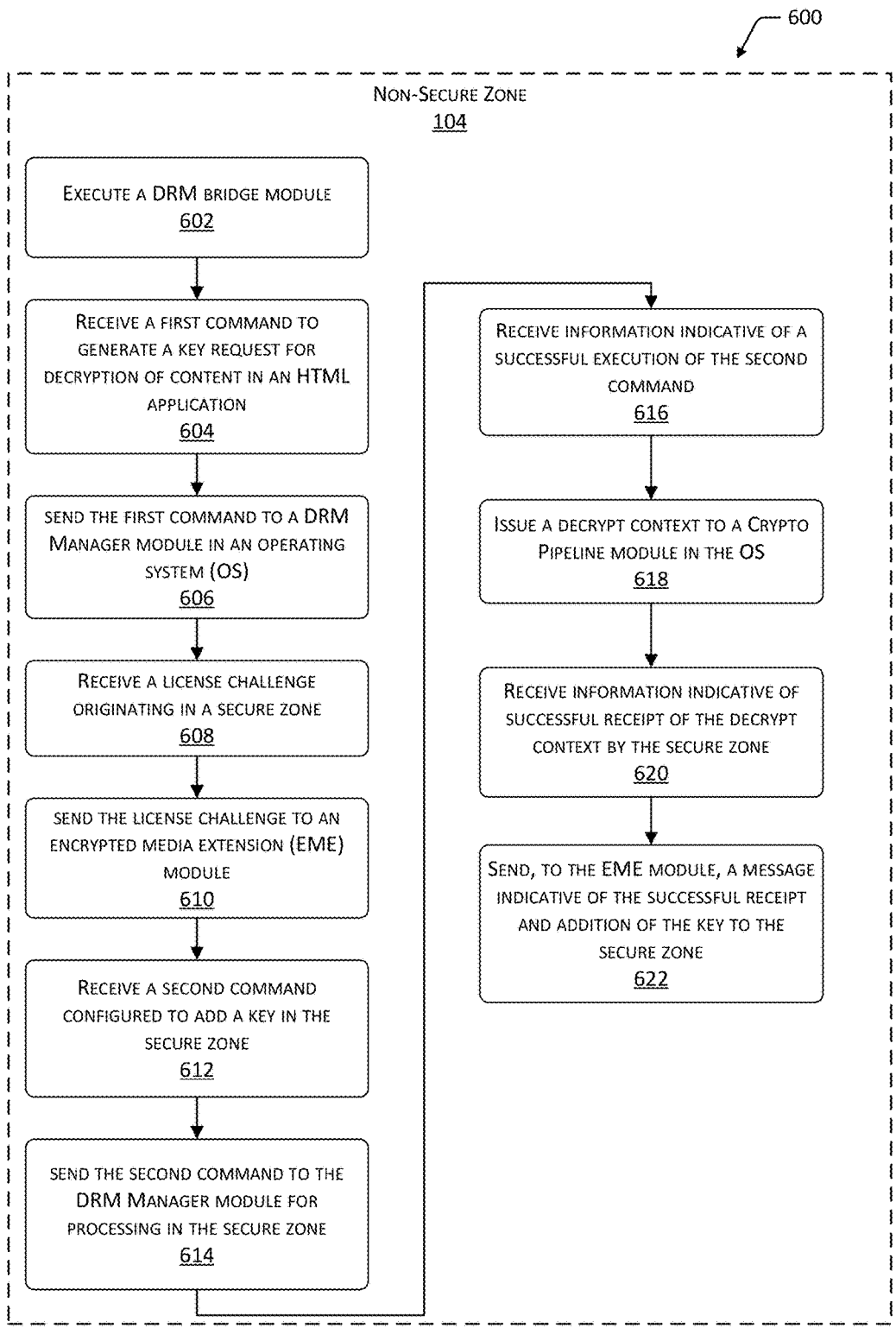
FIG. 6 is a flow diagram of a process of a DRM bridge module acquiring and storing keys for decryption and presentation of the encrypted content.

FIG. 6 is a flow diagram 600 of a process of the DRM bridge module 222(6) acquiring and storing keys for decryption and presentation of the encrypted content 114. Blocks 602 through 622 may operate using the non-secure zone 104.

Block 602 executes the DRM bridge module 222(6).

Block 604 receives from the markup language application 220(1) a first command to generate a key request for decryption of the encrypted content 114. For example, the command may comprise the generate key request as described above with regard to FIG. 4.

Block 606 sends the first command to the DRM manager module 224. As described above, the DRM manager module 224 may comprise an element or function of the non-secure OS module 212.

Block 608 receives a license challenge originating from the secure zone 106. Block 610 sends the license challenge to the EME module 222(4).

Block 612 receives a second command. The second command is configured to add a key into the secure zone 106. For example, the second command may comprise the "ADDKEY" instruction. Block 614 sends the second command to the DRM manager module 224. The DRM manager module 224 in turn sends the second command to the secure zone application module 136 for processing.

Block 616 receives information indicative of a successful execution of the second command. For example, the ADD STATUS message may indicate the encryption key 120 has been successfully added to the secure zone 106.

Block 618 issues the decrypt context 134 to the crypto pipeline module 226 in the non-secure OS module 212. As described above, the decrypt context 134 binds the decrypted key 142 of the secure zone 106 to operations in the non-secure zone 104.

Block 620 receives information indicative of successful receipt of the decrypt context 134 by the secure zone 106. For example, the DC STATUS event having a value of "success" indicates the secure zone 106 is ready for decryption using those keys.

Block 622 sends, to the EME module 222(4), a message indicative of the successful receipt and addition of the decrypted key 142 by the secure zone 106. Subsequent operations, such as using the crypto pipeline module 226 and the media pipeline module 228 may use the decrypted key 142 to decrypt the encrypted content 114 using the secure zone 106.

Figure 7:
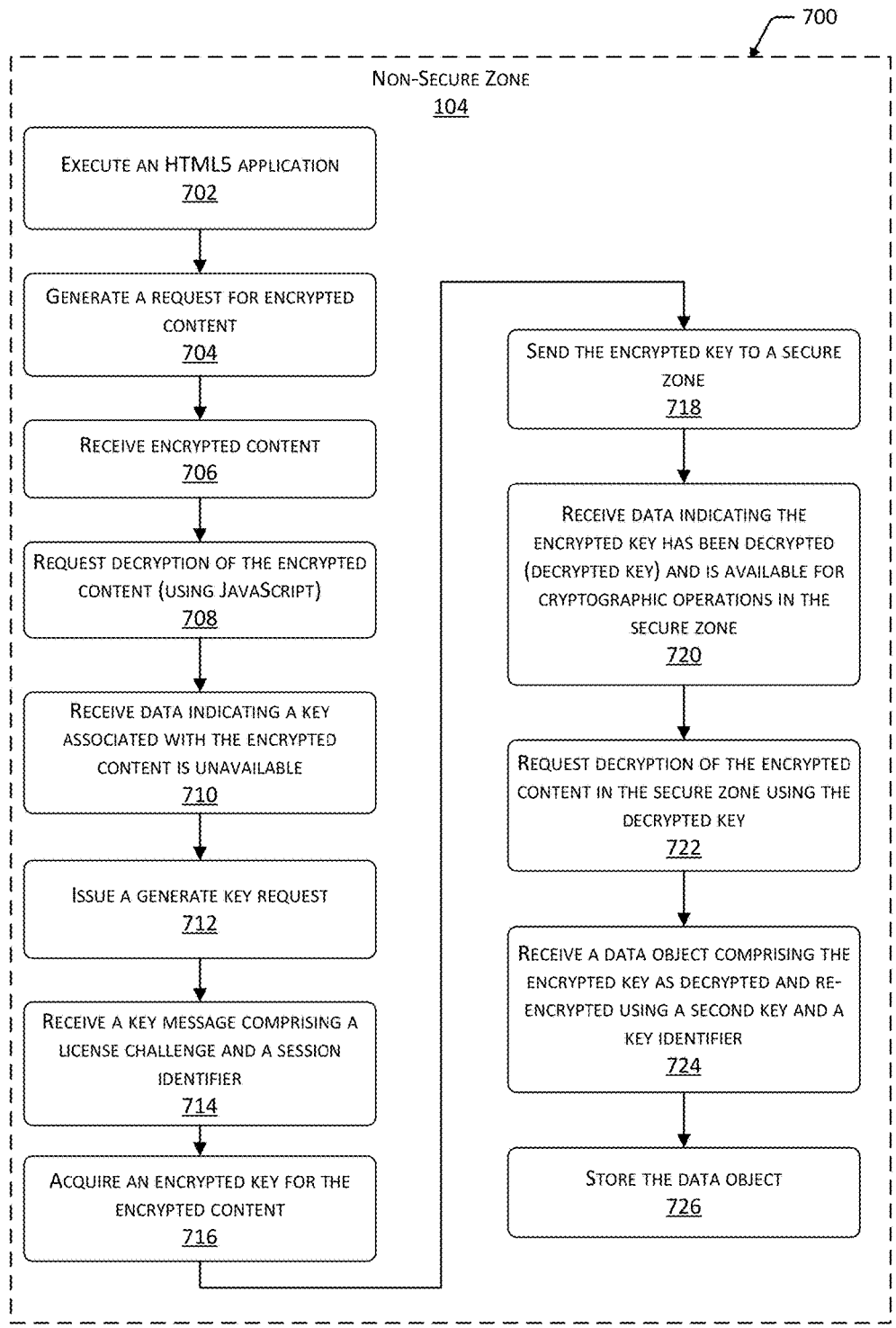
FIG. 7 is a flow diagram of a markup language application handling encryption keys.

FIG. 7 is a flow diagram 700 of the markup language application 220(1) handling the encrypted key 120. Blocks 702 through 726 may operate using the non-secure zone 104.

Block 702 executes the markup language application 220(1), such as the HTML5 application in the non-secure zone 104. Block 704 generates a request for encrypted content 114. For example, the user may activate a control of the HTML5 application configured to initiate playback of streaming encrypted content 114.

Block 706 receives the encrypted content 114. Block 708 requests decryption of the encrypted content 114, such as by issuing a call using script 220(2) which is ultimately processed by the EME module 222(4). Block 710 receives data indicating a key associated with the encrypted content 114 is unavailable. For example, the key may never have been acquired, may have expired, and so forth.

Block 712 issues a request to generate a key for decryption of encrypted content 114. For example, the request may be sent to the EME module 222(4).

Block 714 receives a license challenge. For example, the secure zone application module 136 may originate a KEY MESSAGE comprising the license challenge.

Block 716 acquires an encrypted key 120 for the encrypted content 114. For example, the markup language application 220(1) may use the license challenge to request and receive the encrypted key 120.

Block 718 sends the encrypted key 120 to the secure zone 106. For example, the HTML5 application may issue the ADDKEY instruction to the EME module 222(4).

Block 720 receives data indicating the encrypted key 120 has been decrypted to a decrypted key 142 using the secure zone 106 and is available for cryptographic operations by the secure zone 106. For example, the markup language application 220(1) may receive the KEYADDED event.

Block 722 requests decryption of the encrypted content 114 by the secure zone 106 using the decrypted key 142. For example, the HTML5 application may use a script 220(2) to initiate playback.

As described above, the secure zone application module 136 may be configured to generate an encrypted key 148 from the decrypted key 142 using the SFS key 318 or another key. A data object 132 may be generated which includes the encrypted key 148 and a key identifier or other indicia allowing for the retrieval of a particular encrypted key 148. In some implementations the data object 132 may be formatted as a JWE object. Block 724 receives the data object 132.

The markup language application 220(1) may then store the data object 132 in a data structure accessible to the markup language application 220(1). For example, the HTML5 application may use the IndexedDB API to store (and retrieve) the data object 132. At a later time, the markup language application 220(1) may retrieve the particular data object 132, such as by using the key identifier, and provide the data object 132 to the secure zone application module 136 for processing. Retrieval is discussed in more detail below with regard to FIG. 10.

Figure 8:
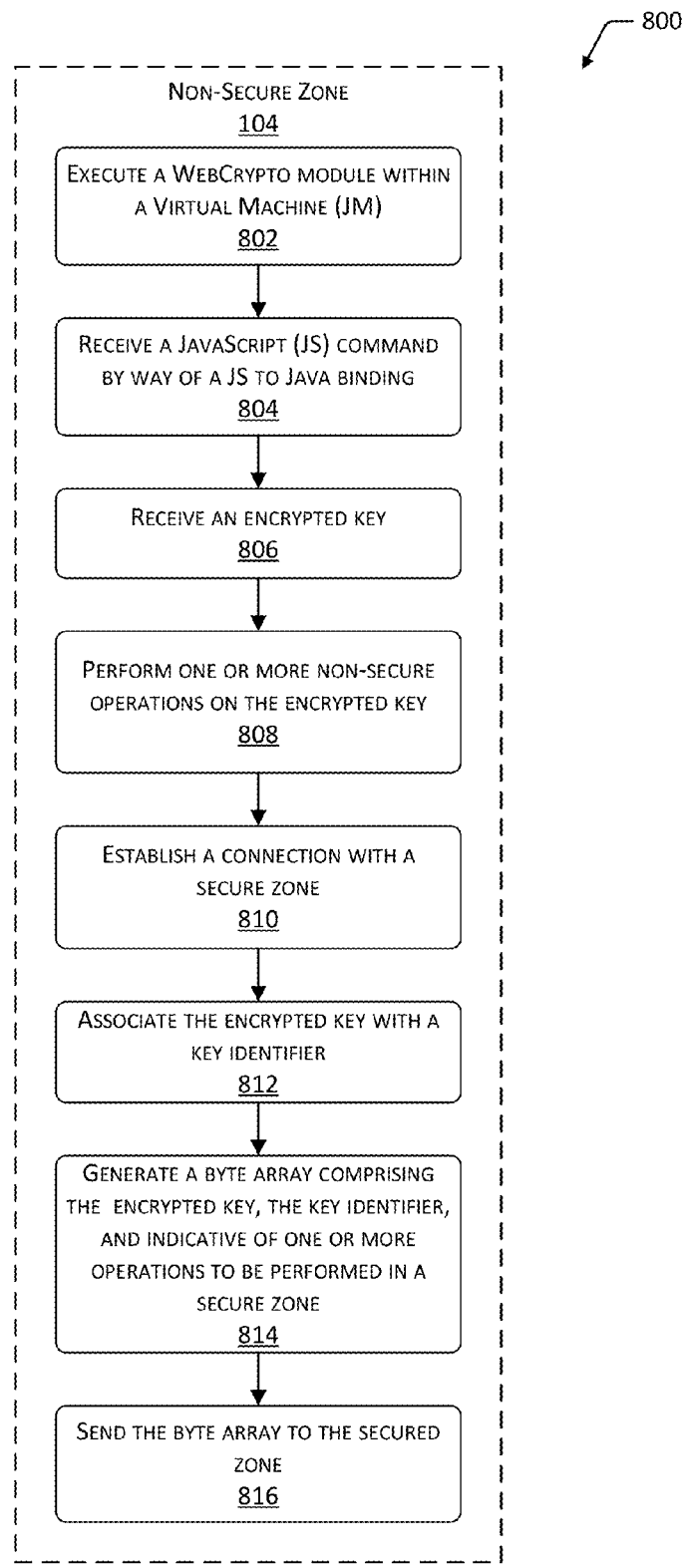
FIG. 8 is a flow diagram of using an interpreted application to generate a byte array which includes the key, and sending the byte array to the secure zone for processing.

FIG. 8 is a flow diagram 800 of using an interpreted application such as the WebCrypto module 222(3) to generate a byte array which includes the key, and sending the byte array to the secure zone 106 for processing. Blocks 802 through 816 may operate using the non-secure zone 104.

Block 802 executes the WebCrypto module 222(3) within the VM module 214. Block 804 receives a JS command by a way of a JS to Java binding. For example, the HTML5 application 220(1) may use a script 220(2) to request presentation of the encrypted content 114. This binding provides an association between the operations occurring within the HTML5 application by way of JS and the operations occurring in virtual machine.

Block 806 receives the encrypted key 120 associated with the encrypted content 114. For example, the encrypted key 120 may be delivered as a JWE object 132.

Block 808 performs one or more non-secure operations on the encrypted key 120. For example, these operations may include a base64 conversion of at least a portion of the JWE object 132, parsing header information stored in the JWE object 132, public key verification, and so forth.

Block 810 establishes a connection with the secure zone 106 or the secure zone application module 136. For example, the WebCrypto module 222(3) may establish the connection using the WebCrypto service 310.

Block 812 associates the encrypted key with a key identifier. The key identifier may be used to reference the particular key associated with particular encrypted content 114.

Block 814 generates the byte array comprising the encrypted key 120, the key identifier, and may also include information indicative of one or more operations to be performed by the secure zone 106. For example, that the key within is to be decrypted.

Block 816 sends the byte array to the secured zone 106. As described above, the secure zone application module 136 may be configured to perform one or more cryptographic operations, such as decrypting the key.

Figure 9:
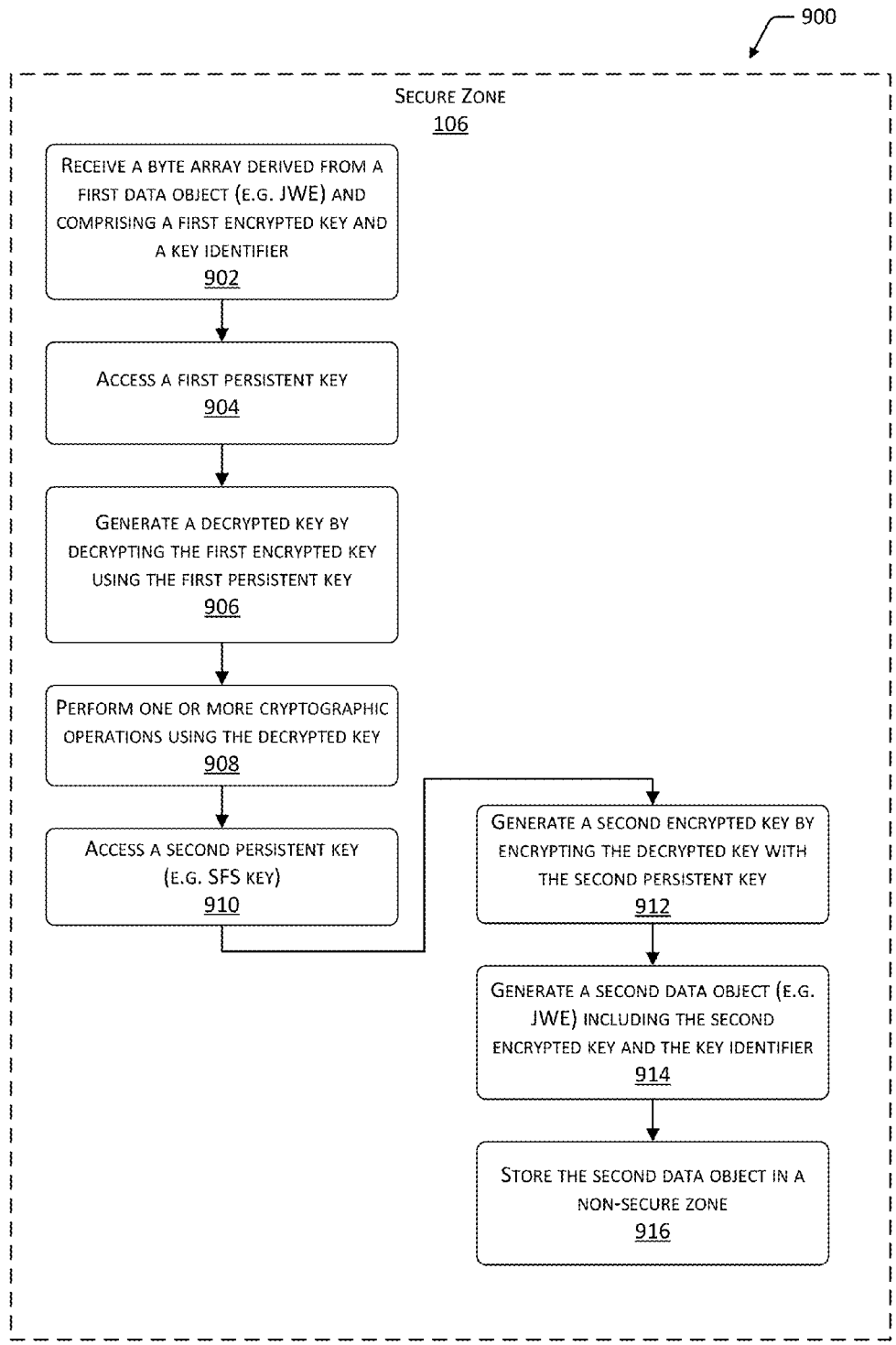
FIG. 9 is a flow diagram of using the byte array to generate a data object which includes a key identifier and an encrypted version of the key suitable for storage in a non-secure zone.

FIG. 9 is a flow diagram 900 of using the byte array to generate a data object 132 which includes a key identifier and an encrypted version of the key suitable for storage in a non-secure zone 104. Blocks 902 through 916 may operate using the secure zone 106.

Block 902 receives a byte array derived from a first data object 132(1), such as the JWE object 132(1). As described above, the byte array comprises the encrypted key 120 and a key identifier.

Block 904 accesses a first persistent key. The party which encrypted the encrypted key 120, such as the license server 116, or the key provisioning server 122, may know this persistent key. For example, the first persistent key may comprise the system keys 316, which are known to the media device 102 manufacturer and the media device 102 itself.

Block 906 generates the decrypted key 142 by decrypting the first encrypted key 120 using the first persistent key, such as the system key 316. Block 908 performs one or more operations using the decrypted key 142. These may include cryptographic operations such as encryption or decryption, or non-cryptographic operations such as performing a base64 conversion.

Block 910 accesses a second persistent key. The second persistent key may be unique to the processor 202 or hardware coupled thereto. For example, second persistent key may comprise the SFS key 318.

Block 912 generates a second encrypted key 148 by encrypting the decrypted key 142 with the second persistent key, such as the SFS key 318. As described above, the second persistent key is configured to be accessible only by the secure zone 106. The secure zone 106 may be configured to prohibit export of the second persistent key to the non-secure zone 104. The encrypted key 148 is now encrypted using a key which may be known only to the media device 102.

Block 914 generates a second data object which includes the key identifier and the second encrypted key 148. For example, a JWE object 132(2) may be created. The key identifier provides an association between the encrypted key 120 and the encrypted key 148.

Block 916 stores the second data object, such as the JWE object 132(2), with the non-secure zone 104. In one implementation, the secure zone 106 may write to a memory location which is accessible to the non-secure zone 104. In another implementation, common memory hardware may be shared between the non-secure zone 104 and the secure zone 106. In this implementation, a bit, flag, or other designator may be used to indicate whether the memory location is accessible to the non-secure zone 104, the secure zone 106, or both. With this implementation, storing the second data object may include writing the second data object to a memory location and changing the designator of that memory location to the non-secure zone 106.

The key identifier is available and readable in the non-secure zone 104, and thus may be used to retrieve the particular second data object 132(2) upon demand.

Once operations using the decrypted key 142 are complete, and with the second data object 132(2) stored in the non-secure zone 106, a block (not shown) may purge the memory associated with the secure zone 106.

Figure 10:
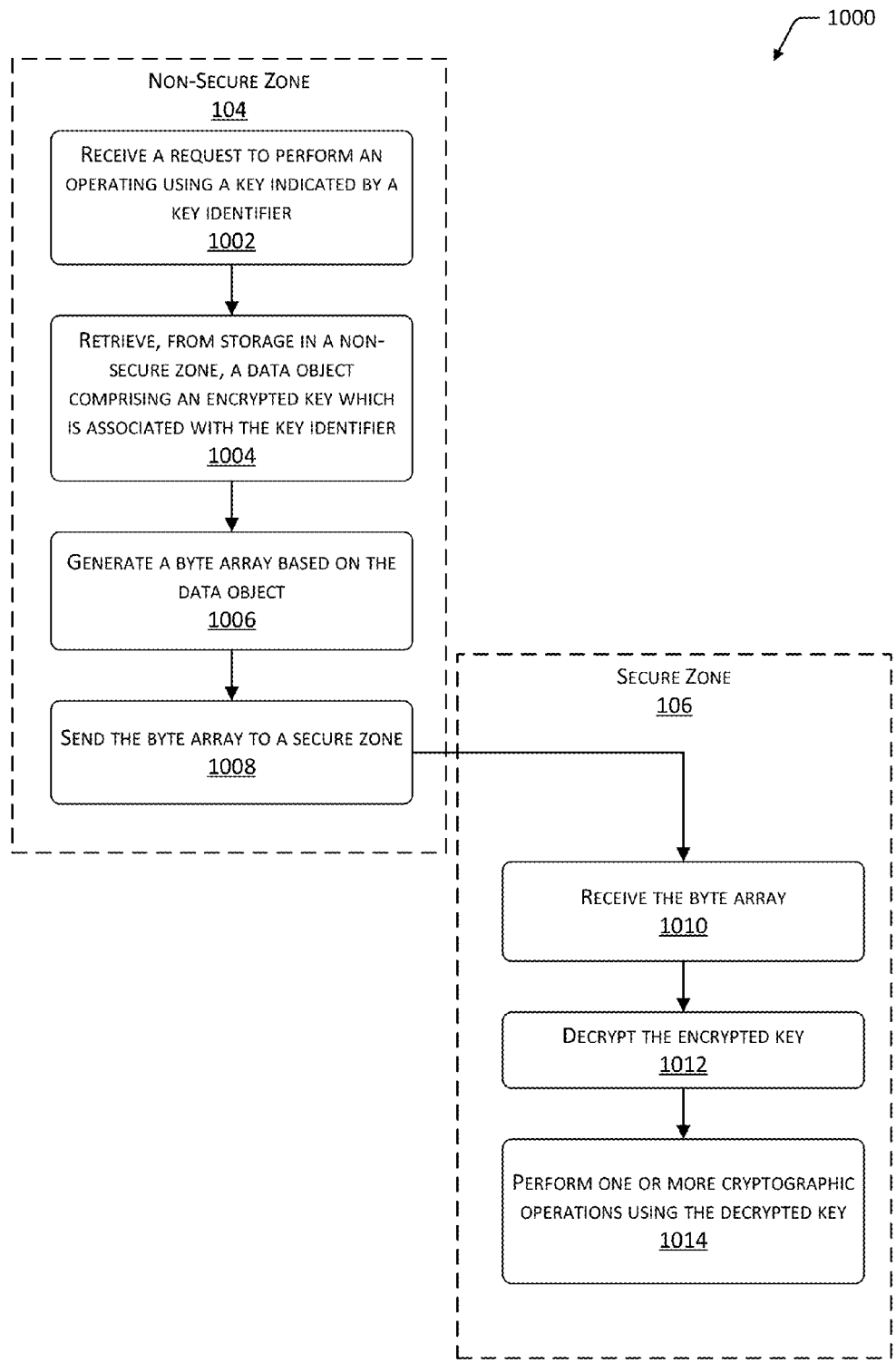
FIG. 10 is a flow diagram of retrieving the data object stored by the non-secure zone to perform cryptographic operations with secure zone.

FIG. 10 is a flow diagram 1000 of retrieving the data object 132(2) stored in the non-secure zone 104 to perform cryptographic operations with the secure zone 106. As described above, the key identifier associates the encrypted key 120 and the encrypted key 148 (or the objects within which these are stored) with one another. Blocks 1002 through 1008 may operate using the non-secure zone 104, while blocks 1010 through 1014 may operate using the secure zone 106.

Block 1002 receives a request to perform one or more cryptographic operations using a key indicated by the key identifier. For example, the markup language application 220(1) may request to restore a streaming session to begin playback of previously discontinued encrypted content 114 which used the key identified by the key identifier "12345".

Block 1004 retrieves from storage in the non-secure zone 104 a data object such as the JWE object 132(2) using the key identifier. For example, the markup language application 220(1) may make a call to the IndexedDB API to retrieve the JWE object 132 having the key identifier value of "12345". The IndexedDB API may then return the encrypted key 148.

Block 1006 generates a byte array from the retrieved data object 132(2). In one implementation, the byte array may be generated at least in part by parsing header information stored in the JWE object 132(2).

Block 1008 sends the byte array to the secure zone 106. Block 1010 receives the byte array. The secure zone application module 136 may process the byte array, such as performing the operations specified within the byte array. Block 1012 decrypts the encrypted key 148, to provide the decrypted key (cleartext) 142.

Block 1014 performs one or more cryptographic operations using the decrypted key. For example, the markup language application 220(1) may resume play of the previously discontinued encrypted content 114. By retrieving the requisite keys from local storage on the media device 102, the encrypted content 114 may be presented with less delay. As a result, the experience of the user of the media device 102 may be improved. Furthermore, elimination of another request for encryption keys by the media device 102 may reduce the load on the license server 116, reducing operating and equipment costs for the operator thereof.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
within a secure zone executing on a processor of a device:
receiving a byte array derived from a first data object, wherein the byte array comprises a first encrypted key;
accessing a first persistent key;
generating a decrypted key by decrypting the first encrypted key using the first persistent key;
performing one or more cryptographic operations using the decrypted key;
accessing a second persistent key unique to the device;
generating a second encrypted key by encrypting the decrypted key with the second persistent key;
generating a second data object including the second encrypted key; and
sending the second data object to an application encoded in hypertext markup language (HTML), wherein the HTML application is executed by a non-secure zone executing on the processor; and
within the non-secure zone executing on the processor:
storing the second data object in a memory location accessible to the HTML application.

2. The method of claim 1, wherein:
the device is configured to operate the non-secure zone by:
limiting access to processes of the non-secure zone to a first set of one or more memory locations; and
providing a first set of non-secure operations for execution on the processor; and
the device is configured to operate the secure zone by:
limiting access to processes of the secure zone to a second set of the one or more memory locations;
providing a second set of cryptographic operations for execution on the processor, wherein the second set of cryptographic operations differs from the first set of non-secure operations; and
controlling access to one or more components of the device.

3. The method of claim 1, further comprising:
within the non-secure zone executing on the processor:
instantiating a virtual machine executing an interpreted application;
responsive to a call by the HTML application, performing with the interpreted application one or more non-secure operations on the first data object, the one or more non-secure operations including one or more of:
generating the byte array at least in part by parsing header information stored in the first data object; or
verifying a public key; and
sending, to the secure zone, the byte array, wherein the HTML application is coded in at least HTML revision 5 (HTML5).

4. The method of claim 3, further comprising:
within the non-secure zone executing on the processor:
generating, with the HTML application, a request for encrypted content;
providing the request for encrypted content to a content server;
receiving, from the content server, the first encrypted key; and
receiving, from the content server, at least a portion of the encrypted content.

5. The method of claim 3, further comprising:
within the non-secure zone executing on the processor:
establishing a binding between a script executed by the HTML application and the interpreted application.

6. The method of claim 1, wherein the first encrypted key comprises one or more of:
a key value to encode or decode, compliant with an Advanced Encryption Standard (AES) as promulgated by National Institute of Standards and Technology (NIST);
a hash-based message authentication code (HMAC); or
a key value compliant with AES Key Wrap Specification standard as promulgated by the NIST.

7. The method of claim 1, further comprising:
within the non-secure zone executing on the processor:
writing the second data object to the memory location using an application programming interface call to IndexedDB.

8. The method of claim 1, further comprising:
within the secure zone executing on the processor:
writing the second data object in the memory location; and
changing a designator of the memory location from associating the memory location with the secure zone to associating the memory location with the non-secure zone.

9. The method of claim 1, wherein the generating the decrypted key comprises unwrapping the first encrypted key using the Advanced Encryption Standard (AES) Key Wrap Specification standard as promulgated by the National Institute of Standards and Technology.

10. The method of claim 1, wherein:
the byte array comprises a key identifier; and
the second data object comprises the key identifier.

11. The method of claim 1, further comprising:
within the non-secure zone executing on the processor:
receiving the second data object at the HTML application, wherein the HTML application is coded in at least HTML revision 5 (HTML5).

12. The method of claim 1, further comprising:
purging memory used by the secure zone; and
wherein the second persistent key is configured to be accessible only within the secure zone, and further wherein the secure zone prohibits export of the second persistent key to the non-secure zone.

13. The method of claim 1, further comprising:
a key identifier associating the first data object and the second data object;
within the non-secure zone executing on the processor:
receiving a request to perform the one or more cryptographic operations using a key indicated by the key identifier;
retrieving, from storage of the non-secure zone, the second data object using the key identifier;
generating a second byte array at least in part by parsing header information stored in the second data object; and
sending, to the secure zone, the second byte array; and
within the secure zone executing on the processor:
receiving the second byte array;
decrypting the second encrypted key to generate a decrypted second key; and
performing the one or more cryptographic operations using the decrypted second key.

14. The method of claim 1, further comprising:
within the non-secure zone executing on the processor:
executing a digital rights management (DRM) bridge module, the DRM bridge module configured to perform functions including:
receiving, from the HTML application, a first instruction to generate a key request for decryption of content;
sending the first instruction to a DRM manager module;
receiving a license challenge originating from the secure zone;
sending the license challenge to an encrypted media extension (EME) module;
receiving a second instruction configured to add a key to the secure zone;
sending the second instruction to the DRM manager module for processing by the secure zone;
receiving information indicative of a successful execution of the second instruction;
issuing a decrypt context to a crypto pipeline module, wherein the decrypt context binds the decrypted key accessible to the secure zone to operations in the non-secure zone;
receiving information indicative of successful receipt of the decrypt context by the secure zone; and
sending, to the EME module, a message indicative of the successful receipt and addition of the key by the secure zone.

15. The method of claim 1, wherein:
a first operating system executes with the secure zone on the processor; and
a second operating system executes within the non-secure zone on the processor and further wherein the first operating system is configured to support a restricted set of operations relative to the second operating system.

16. A device, comprising:
a communication interface;
a display device;
a memory storing computer-executable instructions; and
a processor configured to execute the computer-executable instructions to:
within a secure zone executing on the processor of the device:
receive a first data object comprising a first encrypted key;
generate a decrypted key by decrypting the first encrypted key using a first system key;
perform one or more operations using the decrypted key;
generate a second encrypted key by encrypting the decrypted key with a second system key that is unique to the device;
generate a second data object that comprises the second encrypted key; and
send the second data object to an application encoded in hypertext markup language (HTML), wherein the HTML application is executed by a non-secure zone executing on the processor; and
within the non-secure zone executing on the processor:
store the second data object in a memory location accessible to the HTML application.

17. The device of claim 16, wherein the processor is further configured to:
operate the non-secure zone in the device, wherein the secure zone permits cryptographic operations using a restricted set of operations that are different from a non-restricted set of non-secure operations permitted with the non-secure zone;
execute a first operating system in the non-secure zone;
execute the HTML application in the non-secure zone, wherein the HTML application is configured to present encrypted content;
receive the encrypted content by way of an encrypted connection using the communication interface;
receive the first data object, wherein the first encrypted key in the first data object is configured to decrypt the encrypted connection;
issue, from the HTML application, one or more instructions to decrypt the encrypted connection and present the encrypted content on the display device;
perform one or more non-secure operations within a virtual machine; and
call, from the virtual machine, a secure zone service to provide one or more of the cryptographic operations using the secure zone.

18. The device of claim 17, wherein the processor is further configured to:
decrypt at least a portion of the encrypted connection using the decrypted key;
decrypt the encrypted content;
render the decrypted content to be presented by the display device;
send the second encrypted key to the non-secure zone for storage; and
purge memory associated with the secure zone, after the second encrypted key is sent to the non-secure zone for storage.

19. A device, comprising:
a communication interface;
a display device;
a memory storing computer-executable instructions; and
a processor configured to execute the computer-executable instructions to:
within a non-secure zone executing on the processor:
execute an application coded in hypertext markup language (HTML);
receive a first encrypted key from a content server, in response to a request for encrypted content, as generated by the HTML application;
instantiate a virtual machine executing an interpreted application;
perform, with the interpreted application, one or more non-secure operations on a first data object; and
send the first data object to a secure zone; and
within the secure zone executing on the processor:
receive the first data object, wherein the first data object comprises the first encrypted key;
generate a decrypted key by decrypting the first encrypted key using a first key;
perform one or more cryptographic operations using the decrypted key;
generate a second encrypted key by encrypting the decrypted key with a second key, wherein the second key is configured to be accessible only by the secure zone;
generate a second data object that comprises the second encrypted key and a second key identifier, wherein the second key identifier provides an association between the first encrypted key and the second encrypted key; and
send the second data object to the non-secure zone for storage.

20. The device of claim 19, wherein the processor is further configured to:
within the non-secure zone:
operate the non-secure zone;
execute a first operating system and the HTML application in the non-secure zone;
receive the encrypted content;
receive the first data object;
request performance of the one or more of the cryptographic operations in the secure zone.

21. The device of claim 19, wherein the processor is further configured to:
within the non-secure zone:
receive the second data object;
store the second data object in storage of the non-secure zone;
receive a request, at the non-secure zone, to perform the one or more cryptographic operations using the second encrypted key;
retrieve the second data object from the storage of the non-secure zone, using the second key identifier; and
within the secure zone:
decrypt the second encrypted key to generate a decrypted second key; and
perform the one or more cryptographic operations using the decrypted second key.

* * * * *